US008529329B2

(12) United States Patent
Kido

(10) Patent No.: US 8,529,329 B2

(45) Date of Patent: Sep. 10, 2013

(54) GAMING MACHINE AND CONTROL METHOD THEREOF

(75) Inventor: Katsuhiro Kido, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 480 days.

(21) Appl. No.: 12/768,035

(22) Filed: Apr. 27, 2010

(65) Prior Publication Data

US 2010/0291989 A1 Nov. 18, 2010

(30) Foreign Application Priority Data

May 15, 2009 (JP) ................................ 2009-118859

(51) Int. Cl.
*A63F 9/24* (2006.01)
*A63F 13/00* (2006.01)

(52) U.S. Cl.
USPC .................... 463/17; 463/16; 463/25; 463/42

(58) Field of Classification Search
USPC ........................................................... 463/17
See application file for complete search history.

(56) References Cited

U.S. PATENT DOCUMENTS

| | | | | |
|---|---|---|---|---|
| 4,396,193 | A * | 8/1983 | Reinhardt et al. | 463/22 |
| 5,570,885 | A * | 11/1996 | Ornstein | 463/27 |
| 5,718,431 | A * | 2/1998 | Ornstein | 273/292 |
| 5,728,002 | A * | 3/1998 | Hobert | 463/17 |
| 5,743,798 | A * | 4/1998 | Adams et al. | 463/17 |
| 5,829,749 | A * | 11/1998 | Hobert | 273/274 |
| 6,059,659 | A * | 5/2000 | Busch et al. | 463/17 |
| RE37,588 | E * | 3/2002 | Ornstein | 273/292 |
| 6,648,757 | B1 * | 11/2003 | Slomiany et al. | 463/20 |
| 6,652,378 | B2 * | 11/2003 | Cannon et al. | 463/20 |
| 6,656,040 | B1 * | 12/2003 | Brosnan et al. | 463/16 |
| 6,776,714 | B2 * | 8/2004 | Ungaro et al. | 463/27 |
| 6,890,255 | B2 * | 5/2005 | Jarvis et al. | 463/17 |
| 7,094,150 | B2 | 8/2006 | Ungaro et al. | |
| 7,121,943 | B2 * | 10/2006 | Webb et al. | 463/25 |
| 7,204,488 | B2 * | 4/2007 | Ilievski | 273/143 R |
| 7,331,860 | B2 * | 2/2008 | Herrmann et al. | 463/16 |
| 7,708,630 | B2 * | 5/2010 | Nicely | 463/17 |
| 7,727,061 | B2 * | 6/2010 | Taylor | 463/16 |
| 7,867,080 | B2 * | 1/2011 | Nicely et al. | 463/25 |
| 7,901,294 | B2 * | 3/2011 | Walker et al. | 463/42 |
| 2001/0028147 | A1 * | 10/2001 | Ornstein et al. | 273/292 |
| 2002/0169017 | A1 * | 11/2002 | Visoenik | 463/17 |
| 2003/0236115 | A1 * | 12/2003 | Chamberlain | 463/16 |
| 2004/0087357 | A1 * | 5/2004 | Johnson | 463/17 |
| 2004/0116179 | A1 * | 6/2004 | Nicely et al. | 463/25 |
| 2005/0192076 | A1 * | 9/2005 | Lowery | 463/17 |
| 2005/0192079 | A1 * | 9/2005 | Lowery | 463/17 |
| 2005/0239536 | A1 | 10/2005 | Ogiwara | |
| 2005/0285336 | A1 * | 12/2005 | Ilievski | 273/143 R |
| 2006/0223629 | A1 * | 10/2006 | Walker et al. | 463/25 |
| 2007/0057452 | A1 * | 3/2007 | Dargue | 273/143 R |
| 2007/0135203 | A1 * | 6/2007 | Nicely | 463/17 |
| 2007/0135204 | A1 * | 6/2007 | Nicely | 463/17 |
| 2012/0276978 | A1 * | 11/2012 | Nicely | 463/17 |

* cited by examiner

*Primary Examiner* — Steven J Hylinski

(74) *Attorney, Agent, or Firm* — Edwards Wildman Palmer LLP

(57) ABSTRACT

A roulette gaming machine includes a plurality of satellites, each of which allows a player to play a lotto-type roulette game while executing a usual roulette game simultaneously. In the lotto-type roulette game, a set of winning numbers for the given number of roulette games is predicted at a time by a player at a satellite, and award is calculated when the given number of roulette games has been executed. The progress of the lotto-type roulette game is controlled with respect to each of the plurality of satellites. When a new player participates in the lotto-type roulette game, the maximum waiting time for the new player equals the time required for one roulette game to be executed. Thus, the reduction of the waiting time can be achieved with respect to a new participant in the lotto-type roulette game.

6 Claims, 17 Drawing Sheets

FIG. 5
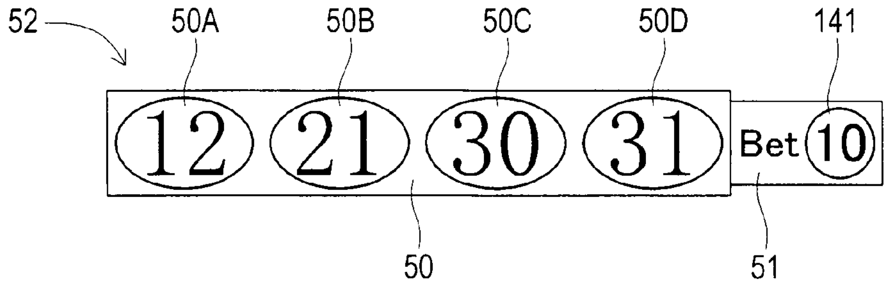
FIG. 6
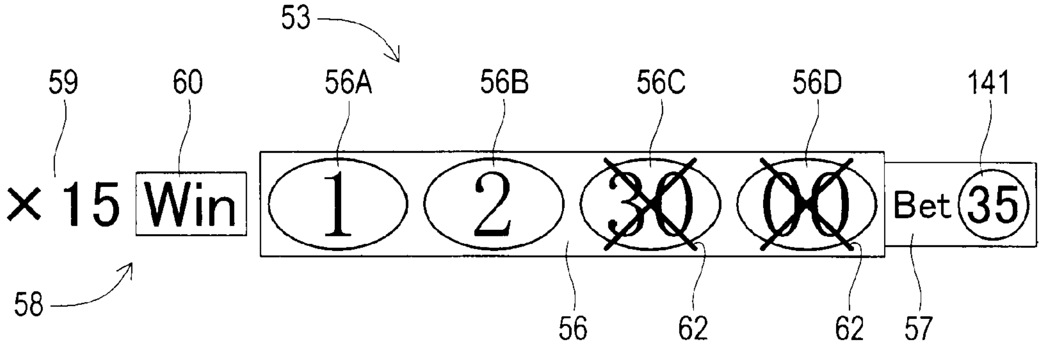
FIG. 7
61
| NUMBER OF IDENTICAL NUMBER PAIRS | AWARD CREDIT (ODDS) |
|---|---|
| 4 | ×2000 |
| 3 | ×180 |
| 2 | ×15 |
| 1 | 0 |
| 0 | 0 |

161

| NUMBER OF IDENTICAL NUMBER PAIRS | AWARD CREDIT (ODDS) |
|---|---|
| 4 | ×20000 |
| 3 | ×500 |
| 2 | ×100 |
| 1 | ×5 |
| 0 | 0 |

| No. | PREDICTION DATA | DESIGNATED NUMBER-OF-GAMES | EXECUTED NUMBER-OF-GAMES | BET NUMBER-OF-CHIPS |
|---|---|---|---|---|
| 1 | 7 6 12 32 | 4 | 4 | 15 |
| 2 | 35 35 35 | 3 | 1 | 21 |
| 3 | 2 9 27 31 | 4 | 0 | 3 |
| 4 | 29 29 29 29 | 4 | 0 | 7 |

GAMING MACHINE AND CONTROL METHOD THEREOF

CROSS-REFERENCE TO RELATED APPLICATIONS

This application claims priority from JP 2009-118859, filed May 15, 2009, the contents of which are hereby incorporated by reference.

BACKGROUND OF THE INVENTION

1. Field of the Invention

The present invention relates to a gaming machine using a roulette game and a control method thereof.

2. Discussion of the Background

Conventionally, gaming machines are known in which a lotto-type roulette game can be executed simultaneously while executing a normal roulette game. Such gaming machines are disclosed for example in U.S. Patent Application Publication No. 2005/0239536A1, Brazilian Patent Application Publication No. PI0501415A, Australian Patent Application Publication No. 2005201670A1,Argentine Patent Application Publication No. 049032A1, European Patent Application Publication 1589506A1, South African Patent Publication No. 200503244A, and Chinese Patent Application Publication No. 1689674A, and the like.

In the lotto-type roulette game, a set of winning numbers for a given number of roulette games is predicted by a player at a time. When the roulette games are executed in the given number of times, the award for each player is calculated. Accordingly, when a new player participates in a lotto-type roulette game, the maximum time period required for the new player to wait before being allowed to participate in a game equals the time period required to execute the given number of roulette games. That is, the larger the given number is, the greater the possibility becomes that the new player may have to wait longer time.

A game related to such a lotto-type roulette game is disclosed in U.S. Patent Publication No. 7094150B2.

The present invention has been devised in view of the aforementioned issues, and an object thereof is to provide a gaming machine capable of reducing a player' s waiting time when newly participating in a lotto-type roulette game, and a control method thereof.

SUMMARY OF THE INVENTION

The present invention provides a gaming machine having the following configuration.

That is, the gaming machine comprises: a plurality of betting terminals, each receiving a bet from a player on one of/both of a first prediction to be used in a roulette game and a set of more than predetermined number of second predictions to be used in a continuous prediction game; and a gaming controller configured to execute the roulette game and the continuous prediction game simultaneously over the plurality of betting terminals, wherein, in order to control execution of the continuous prediction game with respect to each of the plurality of betting terminals, the gaming controller is programmed to perform processing of: (A) identifying, if the gaming controller receives continuous prediction information containing the set of more than predetermined number of second predictions on which the player placed the bet and bet amount on the set of second predictions from at least one of the plurality of betting terminals, actual number of second predictions contained in the continuous prediction information currently received; (B) determining, if the roulette game is repeated after receiving the continuous prediction information same number of times as the actual number of second predictions currently identified, a matching state between each winning outcome of the roulette game currently repeated the same number of times and each content of the second predictions contained in the continuous prediction information; (C) calculating an award based on the matching state currently determined and the bet amount contained in the continuous prediction information currently received; and (D) awarding the award currently calculated to the at least one of the plurality of betting terminals having transmitted the continuous prediction information currently received.

According to the gaming machine, the progress of the continuous prediction game is controlled by each of the plurality of betting terminals through the execution of processing (A) to (D). As a result, when a new player participates in the continuous prediction game, the maximum waiting time for the new player to play equals the time required for one roulette game to have executed. Thus, the gaming machine can decrease the waiting time for a new participant in the continuous prediction game.

The present invention further provides a gaming machine having the following configuration.

That is, the gaming machine comprises: a plurality of betting terminals, each receiving a bet from a player on one of/both of a first prediction to be used in a roulette game and a set of more than predetermined number of second predictions to be used in a continuous prediction game; and a gaming controller configured to execute the roulette game and the continuous prediction game simultaneously over the plurality of betting terminals, wherein each of the plurality of betting terminals comprises: a first input section receiving an input from the player specifying a content of a second prediction in the set of more than the predetermined number of second predictions to be used in the continuous prediction game; a second input section receiving an input from the player specifying number of times the content of the second prediction is to be replicated in the set of more than the predetermined number of second predictions to be used in the continuous prediction game; a third input section receiving an input from the player specifying bet amount on the set of more than the predetermined number of second predictions to be used in the continuous prediction game; and a betting controller programmed to perform processing of: (1) setting the set of more than the predetermined number of second predictions to be used in the continuous prediction game to include the content of the second prediction currently specified at the first input section and the number of times the second prediction is to be replicated currently specified at the second input section; and (2) transmitting to the gaming controller continuous prediction information containing the bet amount specified at the third input section and the set of more than the predetermined number of second predictions currently set, and wherein, in order to control execution of the continuous prediction game with respect to each of the plurality of betting terminals, the gaming controller is programmed to perform processing of: (A) identifying, if the gaming controller receives the continuous prediction information from at least one of the plurality of betting terminals, actual number of second predictions contained in the continuous prediction information currently received; (B) determining, if the roulette game is repeated after receiving the continuous prediction information same number of times as the actual number of second predictions currently identified, a matching state between each winning outcome of the roulette game currently repeated the same number of times and each content of the second predictions contained in the continuous prediction information; (C) calculating an award based on the matching state currently determined and the bet amount contained in the continuous prediction information currently received; and (D) awarding the award currently calculated to the at least one of the plurality of betting terminals having transmitted the continuous prediction information currently received.

According to the gaming machine, through the execution of processing (1), the content and the number of times of the second prediction used in the continuous prediction game can be specified. As a result, the specified number of the second predictions used in the continuous prediction game are set to be the same content as specified. Further, through the execution of processing (2), the bet amount is set with respect to the currently set second predictions. Accordingly, a player participating in the continuous prediction game can be spared the repetitive operations to the continuous prediction game.

Further, according to the gaming machine, the progress of the continuous prediction game is controlled by each of the plurality of betting terminals through the execution of processing (A) to (D). As a result, when a new player participates in the continuous prediction game, the maximum waiting time for the new player to play equals the time required for one roulette game to be executed. Thus, the gaming machine can decrease the waiting time for a new participant in the continuous prediction game.

The present invention further provides a control method of a gaming machine having the following configuration.

That is, the control method of a gaming machine in which a roulette game and a continuous prediction game simultaneously progress over a plurality of betting terminals each receiving a bet from a player on one of/both of a first prediction to be used in the roulette game and a set of more than predetermined number of second predictions to be used in the continuous prediction game, wherein, in order to control execution of the continuous prediction game with respect to each of the plurality of betting terminals, the control method of the gaming machine comprises steps of: (A) identifying, if there is received continuous prediction information containing the set of more than predetermined number of second predictions on which the player placed the bet and bet amount on the set of second predictions from at least one of the plurality of betting terminals, actual number of second predictions contained in the continuous prediction information currently received; (B) determining, if the roulette game is repeated after receiving the continuous prediction information same number of times as the actual number of second predictions currently identified, a matching state between each winning outcome of the roulette game currently repeated the same number of times and each content of the second predictions contained in the continuous prediction information; (C) calculating an award based on the matching state currently determined and the bet amount contained in the continuous prediction information currently received; and (D) awarding the award currently calculated to the at least one of the plurality of betting terminals having transmitted the continuous prediction information currently received.

According to the control method of a gaming machine, the progress of the continuous prediction game is controlled by each of the plurality of betting terminals through the configuration of steps (A) to (D). As a result, when a new player participates in the continuous prediction game, the maximum waiting time for the new player to play equals the time required for one roulette game to have executed. Thus, the gaming machine can decrease the waiting time for a new participant in the continuous prediction game.

The present invention further provides a control method of a gaming machine having the following configuration.

That is, the control method of a gaming machine in which a roulette game and a continuous prediction game simultaneously progress over a plurality of betting terminals each receiving a bet from a player on one of/both of a first prediction to be used in the roulette game and a set of more than predetermined number of second predictions to be used in the continuous prediction game, wherein, in order to control execution of the continuous prediction game with respect to each of the plurality of betting terminals, the control method of the gaming machine comprises steps of: (1) setting, at at least one of the plurality of betting terminals, the set of more than the predetermined number of second predictions to be used in the continuous prediction game to include a content of a second prediction specified by the player at a first input section and number of times the second prediction is to be replicated specified by the player at a second input section; and (2) transmitting, at the at least one of the plurality of betting terminals, continuous prediction information containing bet amount specified by the player at a third input section and the set of more than the predetermined number of second predictions currently set, and (A) identifying, if the continuous prediction information is received from the at least one of the plurality of betting terminals, actual number of second predictions contained in the continuous prediction information currently received; (B) determining, if the roulette game is repeated after receiving the continuous prediction information same number of times as the actual number of second predictions currently identified, a matching state between each winning outcome of the roulette game currently repeated the same number of times and each content of the second predictions contained in the continuous prediction information; (C) calculating an award based on the matching state currently determined and the bet amount contained in the continuous prediction information currently received; and (D) awarding the award currently calculated to the at least one of the plurality of betting terminals having transmitted the continuous prediction information currently received.

According to the control method of a gaming machine, through the configuration of step (1), the content and the number of times of the second prediction used in the continuous prediction game can be specified. As a result, the specified number of the second predictions used in the continuous prediction game are set to be the same content as specified. Further, through the configuration of step (2), the bet amount is set with respect to the currently set second predictions. Accordingly, a player participating in the continuous prediction game can be spared the repetitive operations to the continuous prediction game.

Further, according to the control method of a gaming machine, the progress of the continuous prediction game is controlled by each of the plurality of betting terminals through the configuration of steps (A) to (D). As a result, when a new player participates in the continuous prediction game, the maximum waiting time for the new player to play equals the time required for one roulette game to have executed. Thus, the gaming machine can decrease the waiting time for a new participant in the continuous prediction game.

BRIEF DESCRIPTIONS OF THE DRAWINGS

These and other objects and advantages of the present invention will be more fully apparent from the following detailed description taken in conjunction with the accompanying drawings, in which:

FIG. 5 is a schematic view illustrating a bet display section of a second BET screen according to the embodiment of the present invention;

FIG. 6 is a schematic view illustrating a bet result display section of the second BET screen according to the embodiment of the present invention;

FIG. 7 is a view illustrating an award table according to the embodiment of the present invention;

DESCRIPTION OF THE EMBODIMENT

[General Description of Embodiment of Present Invention]

Hereinafter, an embodiment of a gaming machine according to the present invention embodied in a roulette gaming machine 1 (see FIG. 14) is described in detail with reference to the drawings.

The roulette gaming machine 1 is a gaming machine in which a player predicts a number, etc. to be determined with a roulette wheel 3 (see FIG. 14) and places a bet of a gaming medium such as a coin the player owns on the predicted number, etc., and when the number on which the bet is placed is a winning number, the player is awarded with a predetermined number of coins.

Figure 13:
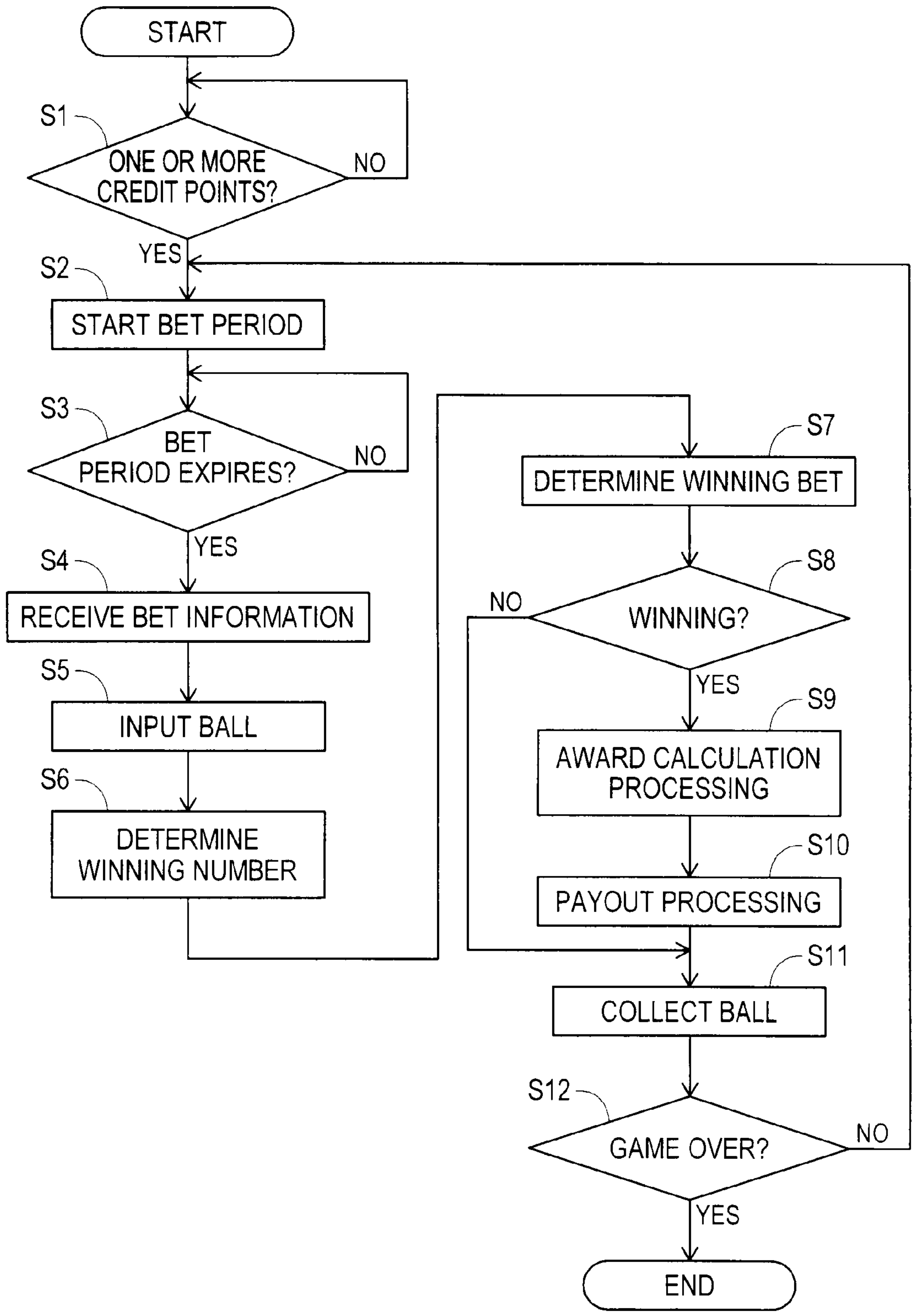
FIG. 13 is a flowchart of a usual roulette game processing program according to the embodiment of the present invention.

In the roulette gaming machine 1 (see FIG. 14) according to the present embodiment, through executing a later-described game processing program, a lotto-type roulette game can be executed (see FIGS. 1, 16, 17, 18 and 19) simultaneously with the execution of a usual roulette game (see FIG. 13). In the lotto-type roulette game, winning numbers for a given number of roulette games are predicted by the player at a time, and when the execution of the given number of roulette games is completed, the award for the player is calculated.

Figure 19:
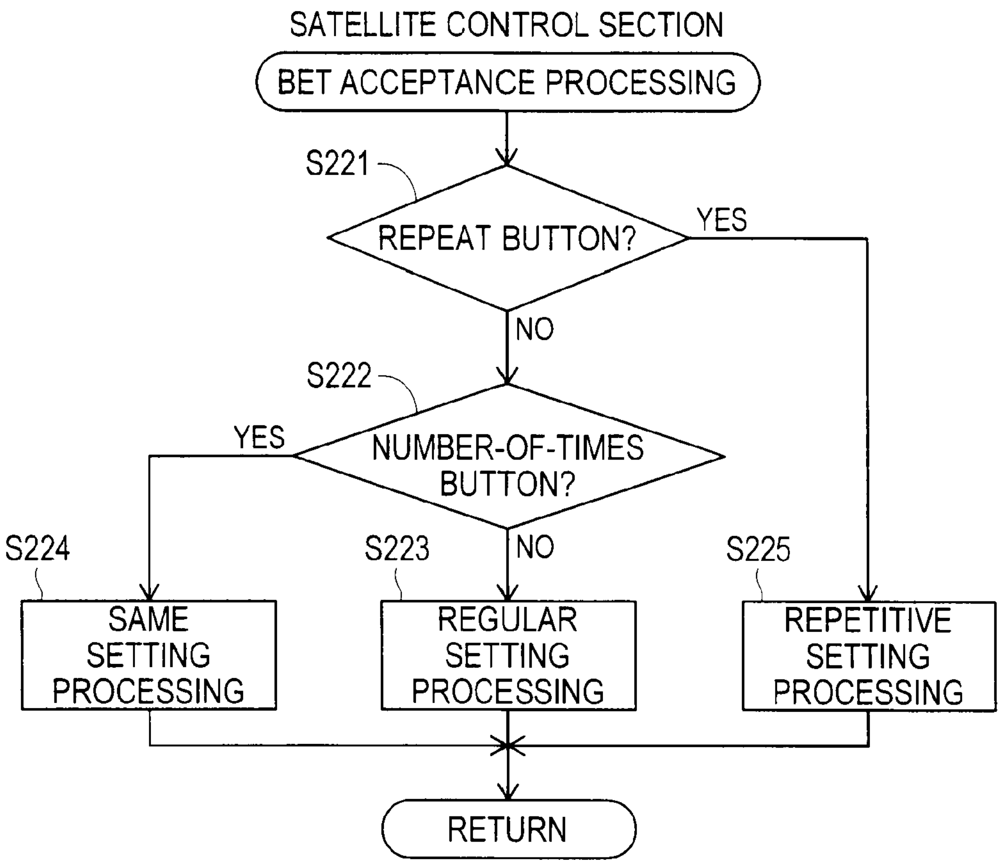
FIG. 19 is a flowchart of a lotto-type roulette game processing program according to the embodiment of the present invention.

In the lotto-type roulette game, if any one of number-of-times buttons 201A, 201B and 201C (see FIG. 4) is pressed (YES at S222 in FIG. 19) during a betting period, same-setting processing of S224 illustrated in FIG. 19 is executed. With this processing, the numbers the player predicts can be set to be a unified number. Then, by the execution of bet information processing of S215 illustrated in FIG. 1, bet amount with respect to the unified number currently predicted can be set. Accordingly, the player participating in the lotto-type roulette game can be spared the repetitive operations in the lotto-type roulette game.

Further, a plurality of satellites 4 (see FIG. 14) are provided for the roulette gaming machine 1 (see FIG. 14) according to the present embodiment. In each satellite 4 (see FIG. 14), the player can play a lotto-type roulette game.

Figure 1:
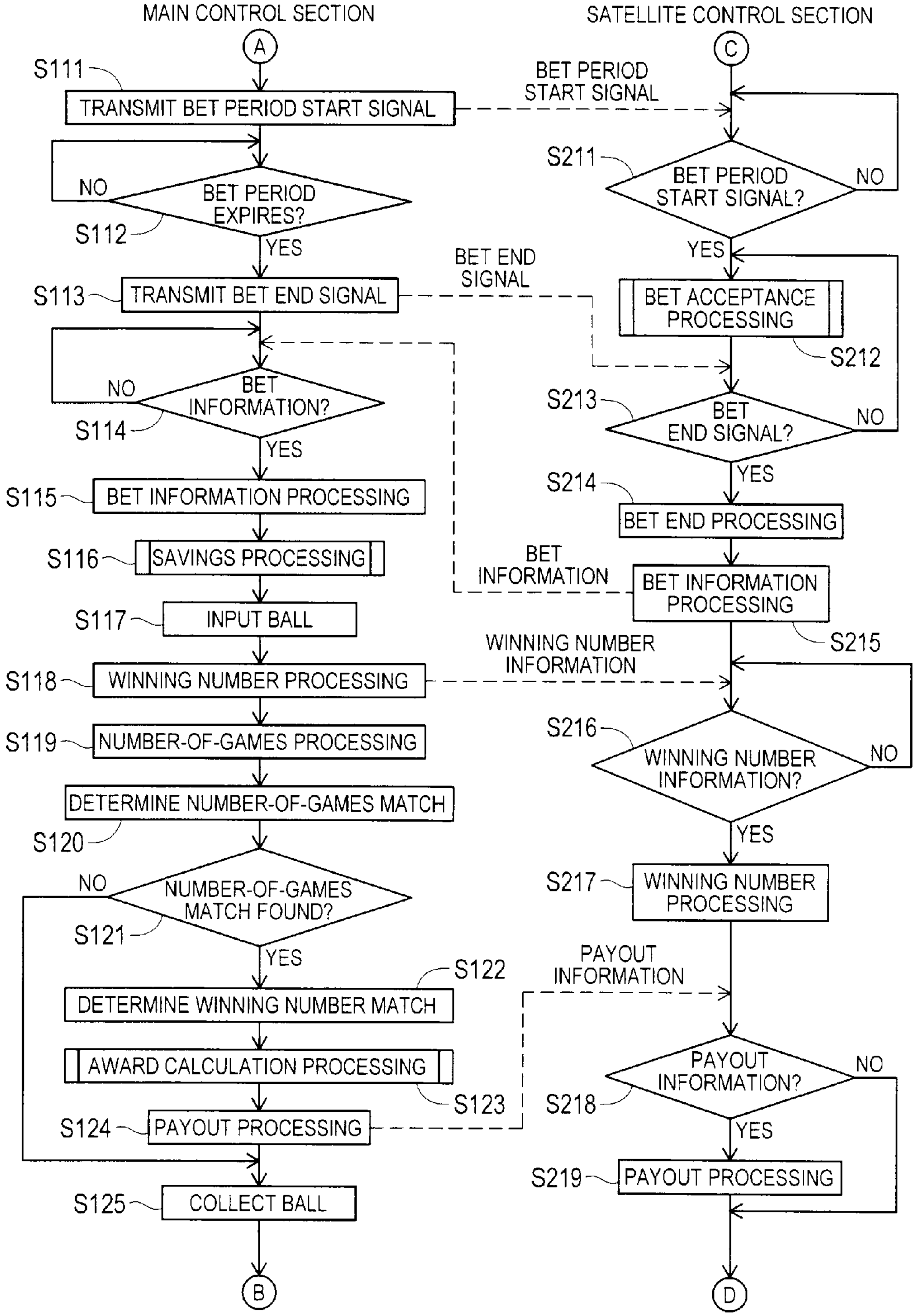
FIG. 1 is a flowchart of a lotto-type roulette game processing program according to an embodiment of the present invention.

In the lotto-type roulette game, processing illustrated in FIG. 1 is executed, such as S115, S122, S123 and S124. Such processing enables control over the lotto-type roulette game with respect to each of the plurality of satellites 4 (see FIG. 14). Accordingly, when a new player participates in a lotto-type roulette game, the maximum waiting time required for the new player to be allowed to play equals the time required for one roulette game to be over. Thus, the reduction of waiting time can be achieved with respect to a new participant in a lotto-type roulette game.

[Schematic Configuration of Roulette Gaming Machine]

Figure 14:
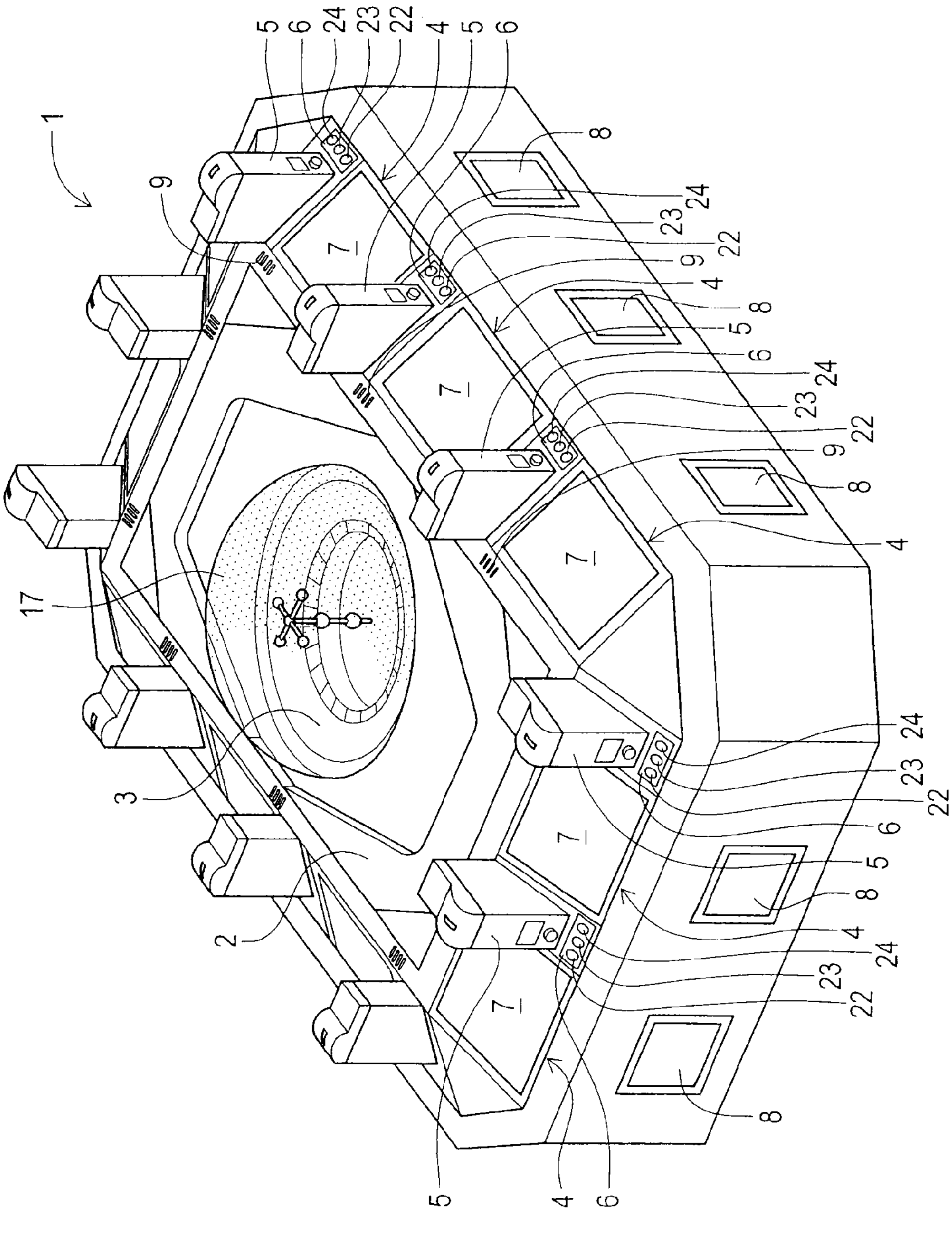
FIG. 14 is an external perspective view illustrating the schematic configuration of the roulette gaming machine according to the embodiment of the present invention.

A schematic configuration of the roulette gaming machine 1 according to the present embodiment will be described with reference to FIG. 14. FIG. 14 is an external perspective view to illustrate the schematic configuration of the roulette gaming machine 1 according to the present embodiment.

As illustrated in FIG. 14, the roulette gaming machine 1 basically includes a cabinet 2 of a main body, the roulette wheel 3 provided substantially in the center of the top face of the cabinet 2, and a plurality of (in the present embodiment, ten) satellites 4 placed so as to surround the roulette wheel 3.

The satellite 4 refers to a place to play a game and includes at least a coin acceptance unit 5 for inputting game media such as coins and tokens for playing the game, a control section 6 including control buttons to be operated by the player to enter commands, and an image display 7 for displaying an image involved in the game. The player operates the control section 6 while seeing the image displayed on the image display 7, to thereby play the game developed therein.

Coin payout openings 8 are provided on the sides of the cabinet 2 where the satellites 4 are installed. A speaker 9 for producing music and effect sound is provided in the upper right portion of the image display 7 of each satellite 4.

[Configuration of Roulette Wheel]

Figure 2:
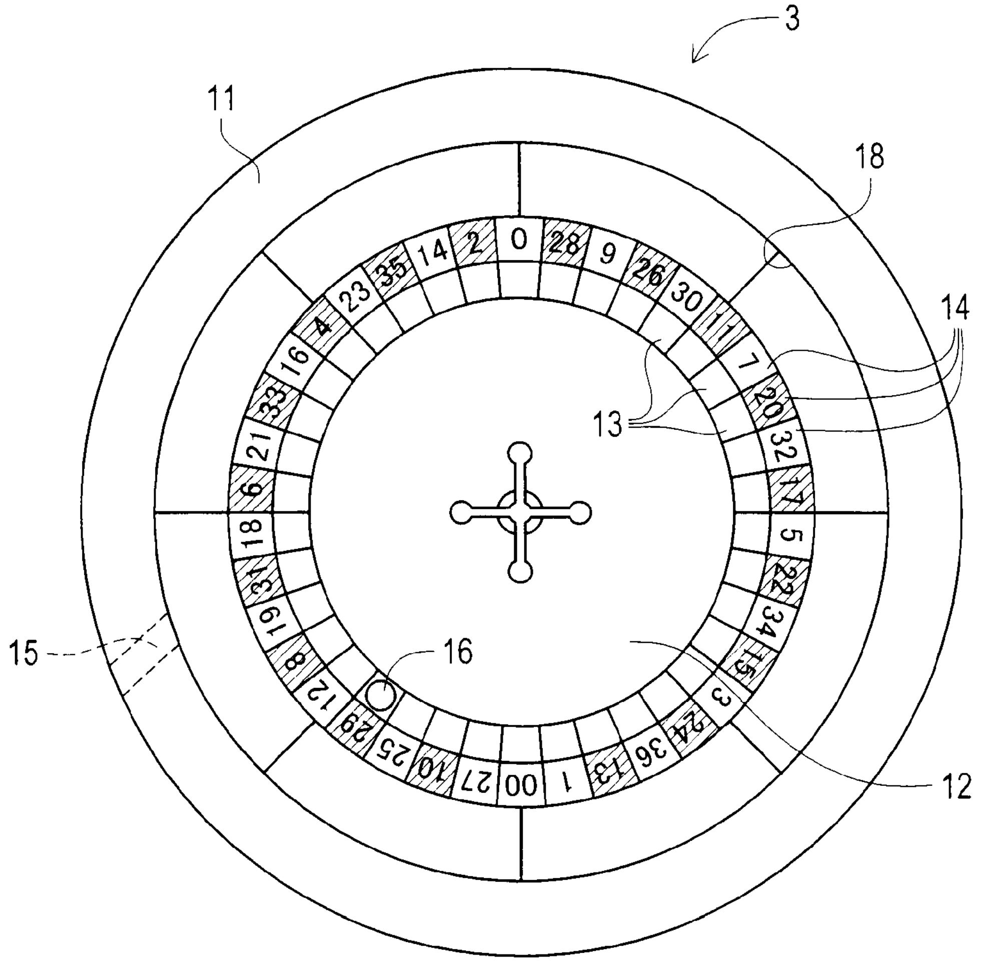
FIG. 2 is a plan view of a roulette wheel according to the embodiment of the present invention.

The configuration of the roulette wheel 3 according to the present embodiment will be discussed with reference to FIG. 2. FIG. 2 is a plan view of the roulette wheel 3 according to the present embodiment.

As illustrated in FIG. 2, the roulette wheel 3 basically includes a frame 11 fixed to the cabinet 2 and a rotation disk 12 housed and rotatably supported inside the frame 11. The rotation disk 12 is formed with a large number of (in the present embodiment, thirty-eight) concave ball housing grooves 13 on the top face thereof. Number indication plates 14 indicating numbers “0”, “00”, and “1” to “36” as graphic characters in a one-to-one correspondence with the ball housing grooves 13 are formed on the top face of the rotation disk 12 in the outer direction of the ball housing grooves 13.

A ball discharging port 15 is formed in the frame 11. A ball discharging unit 85 not illustrated in FIG. 2 (see FIG. 9 described later) is joined to the ball discharging port 15 and a ball 16 is thrown onto the rotation disk 12 from the ball discharging port 15 by the ball discharging unit 85. The whole area above the roulette wheel 3 is covered with a transparent acrylic cover member 17 substantially shaped in a hemispheric shape (see FIG. 14 described above).

The frame 11 is inclined gently to the center and is formed in an intermediate portion with a guide wall 18 for guiding the thrown ball 16 against the centrifugal force and rolling the ball 16. As the rotation speed reduces and the centrifugal force is lost, the ball 16 rolls down the slope of the frame 11, goes inward and arrives at the rotating rotation disk 12.

The ball 16 rolling to the rotation disk 12 further rolls over the number indication plates 14 outside the rotating rotation disk 12 and then is housed in one of the ball housing grooves 13. The number described on the number indication plate 14 corresponding to the ball housing groove 13 in which the ball 16 is housed is determined to be the winning number.

A win determination unit 84 not illustrated in FIG. 2, (see FIG. 9 described later) is installed below the roulette wheel 3 for determining to which number the ball housing groove 13 in which the ball is housed corresponds. Further, a ball collection unit 86 not illustrated in FIG. 2 (see FIG. 9 described later) is installed below the rotation disk 12 for collecting the ball 16 on the rotation disk 12 after each game is over. The ball discharging unit 85, the win determination unit 84, and the ball collection unit 86 are conventionally well known in the art and therefore will not be discussed in detail here.

[Configurations of Control Section and Image Display]

The configurations of the control section 6 and the image display 7 according to the present embodiment will be discussed.

<Configuration of Control Section>

The control section 6 is provided on the side of the image display 7 of the satellite 4 and buttons to be operated by the player are placed, as illustrated in FIG. 14. Specifically, a BET confirmation button 22, a cash out (CASHOUT) button 23, and a help (HELP) button 24 are placed from the left to the right viewed from the position opposed to the satellite 4.

The BET confirmation button 22 is a button to be pressed by the player to confirm the bet after bet operation with the image display 7 described later. When a bet has been confirmed by the player and the bet has been on the number described on the number indication plate 14 corresponding to the ball housing groove 13 in which the ball 16 is housed on the roulette wheel 3 in a game, the player wins the game. When the player wins the game, credit points responsive to the number of chips bet are added to the currently owned credit points of the player. The bet operation is described later in detail.

The cash out button 23 is a button to be pressed by the player usually when the player decides to end the game play. When the player presses the cash out button 23, coins responsive to the currently owned credit points of the player gained with the games and the like (usually, one coin to one credit point) are cashed out to the player from the coin payout opening 8.

The help button 24 is a button to be pressed by the player when the player is unfamiliar with the rules and operation to play the game. When the player presses the help button 24, a help screen indicating various pieces of operation information is immediately displayed on the image display 7.

<Configurations of Image Display>

Figure 3:
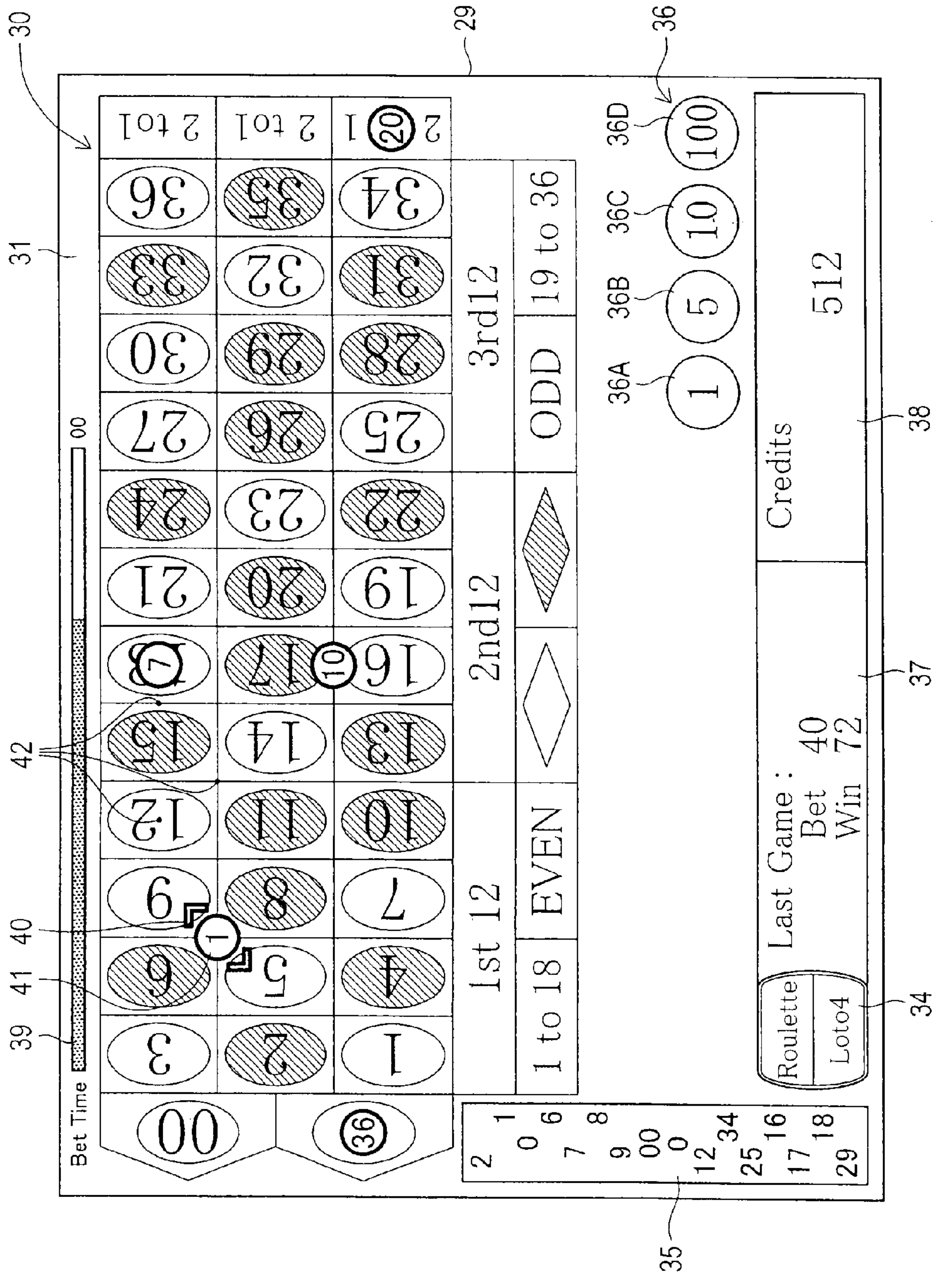
FIG. 3 is a view illustrating an example of a display screen displayed on an image display.
Figure 4:
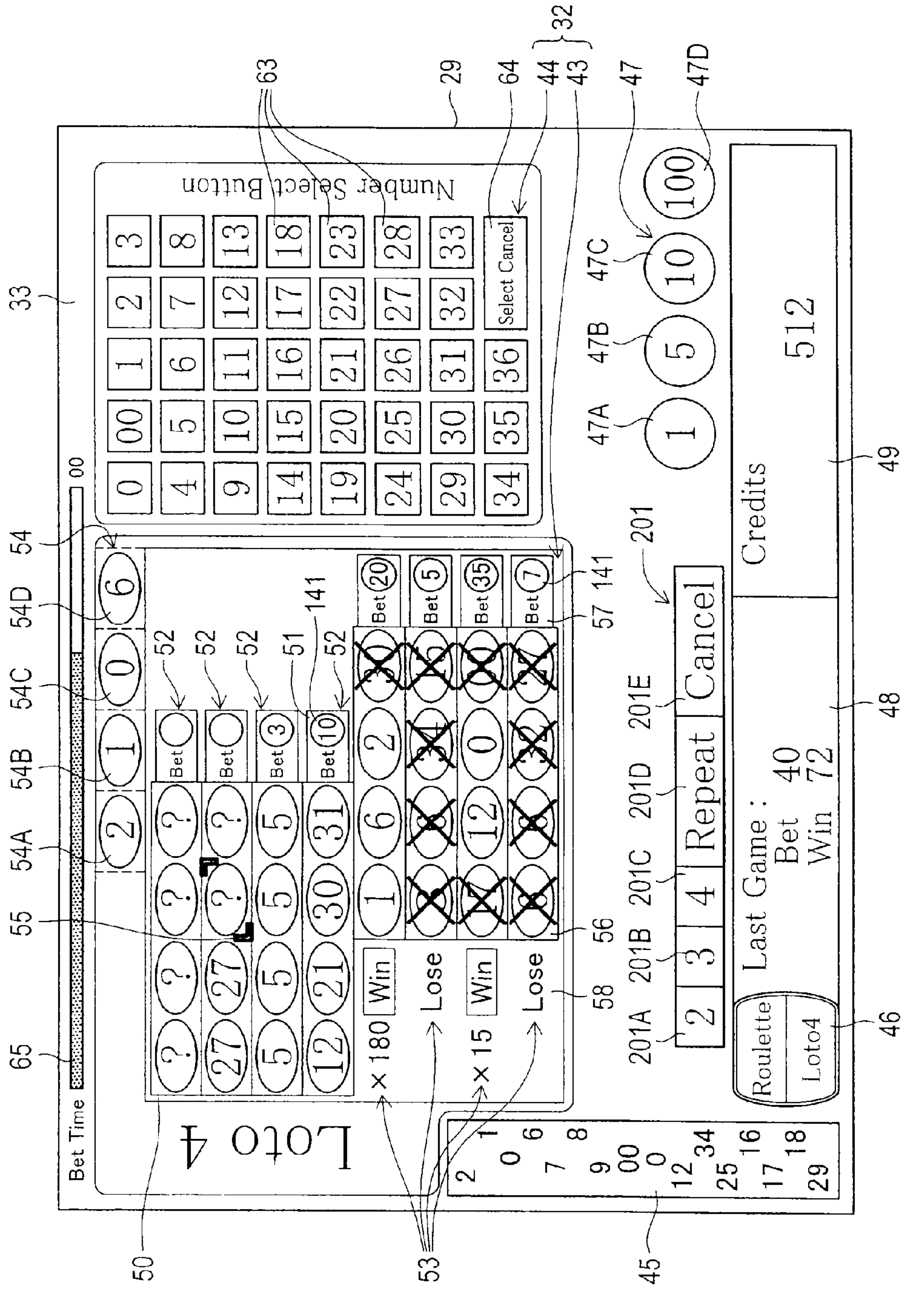
FIG. 4 is a view illustrating an example of a display screen displayed on the image display.

The image display 7 is a so-called touch-panel liquid crystal display with a touch panel 28 (see FIG. 10 described later) attached to the front of the liquid crystal display. The player presses an icon displayed on a liquid crystal screen 29 (see FIGS. 3 and 4 described later) with a finger and the like to select the icon. FIGS. 3 and 4 are views illustrating examples of display screens displayed on the image display 7 during a game.

As illustrated in FIGS. 3 and 4, during the gaming with the roulette gaming machine 1, the image display 7 displays two types of screens: a first BET screen 31 having a usual table-type betting board 30 for allowing the player to predict a winning number only in the current game and a second BET screen 33 having a lotto-type number selection betting board 32 for allowing the player to predict winning numbers in a maximum of four games at a time. The display of the image display 7 is switched between the first BET screen 31 and the second BET screen 33 each time a screen switch button 34, 46 displayed on the liquid crystal screen 29 is pressed. After selecting one of the first BET screen 31 and the second BET screen 33, the player bets a chip using the credit points he/she owns.

<Configurations of First BET Screen>

First, the first BET screen 31 will be discussed based on FIG. 3. The same numbers as the numbers “0”, “00”, and “1” to “36” indicated on the number indication plates 14 are arranged in a grid on the table betting board 30 displayed on the first BET screen 31. Special BET areas for the player to bet a chip by specifying “odd number,” “even number,” “color of number indication plate (red or black),” or “given number range (for example, “1 to 12” or the like)” are also arranged in a grid.

Displayed at a lower portion in the table betting board 30 are a result history display section 35, the above-mentioned screen switch button 34, betting unit selection buttons 36, a payback result display section 37, and a credit point display section 38 from the left to the right of the screen.

The result history display section 35 lists the results of the winning numbers in the previous games (one game refers to an operation sequence from the player betting a chip at a satellite 4, a ball 16 falling in a ball housing groove 13 to paying out credit points based on a winning number). When one game is over, the new winning number is added to the top of the result history display section 35 to allow the player to check the history of the winning numbers of a maximum of sixteen games.

The screen switch button 34 is a button for switching between the first BET screen 31 and the second BET screen 33 displayed on the image display 7 as mentioned above. Two character strings of “Roulette” and “Loto4” are displayed on the screen switch button 34. If the player presses the screen switch button 34 on the liquid crystal screen 29, the first BET screen 31 using the table betting board 30 can be switched to the second BET screen 33 using the number selection betting board 32 for display. Then, the player bets a chip based on the betting board on the currently displayed screen.

The betting unit selection buttons 36 are buttons for allowing the player to bet a chip on a BET area 42 (within a grid square in the provided with a number or a character or on a grid line forming the grid square) specified by the player. The following four types of betting unit selection buttons 36 are included: 1-BET button 36A, 5-BET button 36B, 10-BET button 36C and 100-BET button 36D.

The player first specifies the BET area 42 with a cursor 40 described later by directly pressing the screen with a finger, etc. When the player presses the 1-BET button 36A, one chip is bet at a time (the number of bet chips increases in the order of “1”, “2”, “3” and so on each time the player presses the 1-BET button 36A with a finger). When the player presses the 5-BET button 36B, five chips are bet at a time (the number of bet chips increases in the order of “5”, “10”, “15” and so on each time the player presses the 5-BET button 36B with a finger). When the player presses the 10-BET button 36C, 10 chips are bet at a time (the number of bet chips increases in the order of “10”, “20”, “30” and so on each time the player presses the 10-BET button 36C with a finger). When the player presses the 100-BET button 36C, 100 chips are bet at a time (the number of bet chips increases in the order of “100”, “200”, “300” and so on each time the player presses the 100-BET button 36D with a finger).

According to the above configuration, the betting operation can be simplified when betting a large number of chips.

The payback result display section 37 displays the number of bet chips of the player in the preceding game and the credit points paid-back. Here, the credit points newly gained by the player in the preceding game can be drawn by subtracting the number of bet chips from the paid-back credit points.

The credit point display section 38 displays the credit points presently owned by the player. When the player bets a certain number of chips, the credit points are decremented by the number of the bet chips (one credit point per chip). If the player wins the game and the corresponding credit points are paid back, the credit points owned by the player are incremented by the paid-back credit points. When the credit point owned by the player reaches “0”, the game is over.

A BET timer graph 39 is provided at the upper portion of the table betting board 30. The BET timer graph 39 is a graph for indicating the remaining time during which the player is allowed to bet, and a red graph extends gradually to the right with the passage of time from the start of the bet period. When the graph extends to the rightmost side, the time during which the player can bet in the current game expires. When the bet period of the player at each satellite 4 expires, namely, when the BET timer graph 39 reaches the rightmost side, the ball discharging unit 85 (see FIG. 9 described later) is activated to throw the ball 16 onto the roulette wheel 3.

The cursor 40 indicating the BET area 42 presently selected by the player is displayed on the table betting board 30. A chip mark 41 indicating the number of chips bet and the selected BET area 42 so far is also displayed on the table betting board 30. The number displayed on the chip mark 41 denotes the number of chips bet. For example, a chip mark 41 displayed with a number “7” thereon placed on the grid square “18” as illustrated in FIG. 3 indicates that the player bets seven chips on the number “18”. The betting method in which to place a bet on a single number is called “straight up.”

A chip mark 41 displayed with a number “1” thereon placed at the intersection of the grid squares “5”, “6”, “8” and “9” indicates that the player bets one chip on the four numbers covering “5”, “6”, “8” and “9”. The betting method in which to place a bet covering four numbers is called “corner bet.”

Other available betting methods are as follows: “split bet” is a betting method in which to place a bet covering two numbers on the line between two numbers (adjacent grid squares); “street bet” is a betting method in which to place a bet covering three numbers (for example, “13”, “14”, and “15”) on the end of a horizontal row of the numbers (in FIG. 3, one row in the vertical direction); “five bet” is a betting method in which to place a bet covering five numbers of “0”, “00”, “1”, “2” and “3” on the line between the numbers “00” and “3”; “line bet” is a betting method in which to place a bet covering six numbers (for example, “13”, “14”, “15”, “16”, “17” and “18”) among numbers of two horizontal rows of the numbers (in FIG. 3, two rows in the vertical direction); “column bet” is a betting method in which to place a bet covering twelve numbers on the grid square written as “2 to 1”; and “dozen bet” is a betting method in which to place a bet covering twelve numbers on the grid square written as “1st 12”, “2nd 12” or “3rd 12”. Further, betting methods each covering 18 numbers depending on the number indication plate color (red or black), the odd or even number, whether the number is equal to or less than 18 or is equal to or more than 19 using six grid squares provided at the bottom stage of the table betting board 30 are also available. The betting methods differ in credit award (odds) per chip when the player wins the game in betting a chip (chips).

To place a bet on the first BET screen 31 described above, first the player specifies the BET area 42 (within a grid square of a number or a character or on a line forming the grid square) to bet on the screen and presses the BET area 42 directly with a finger. Consequently, the cursor 40 moves to the specified BET area 42.

Then, whenever the player presses one of the betting unit selection buttons 36 (1-BET button 36A, 5-BET button 36B, 10-BET button 36C, 100-BET button 36D), as many chips as the number indicated by the betting unit selection button are bet on the specified BET area 42. For example, when the player presses the 10-BET button 36C four times, the 5-BET button 36B once, and the 1-BET button 36A three times, a total of forty-eight chips is bet.

<Configurations of Second BET Screen>

Next, the second BET screen 33 will be discussed with reference to FIG. 4. With the second BET screen 33, the player uses the number selection betting board 32 to play a lotto-type roulette game for predicting the winning numbers in a maximum of four games including the current game at a time.

The number selection betting board 32 displayed on the second BET screen 33 basically includes a selection result display section 43 for displaying the selected numbers, and a number selection section 44 to be pressed by the player for selecting a number. Displayed at a lower portion of the number selection betting board 32 are a result history display section 45, the above-mentioned screen switch button 46, betting unit selection buttons 47, a payback result display section 48, and a credit points display section 49 as with the first BET screen 31 described above. Further, same result prediction buttons 201 are also displayed.

The selection result display section 43 displays the four numbers at the maximum selected by the player through the number selection section 44, the number of bet chips, and the game result. Specifically, the selection result display section 43 includes: a plurality of substantially rectangular bet display sections 52 each including a selected number display section 50 for displaying the four numbers at the maximum selected by the player and a number-of-chips display section 51 for displaying the number of bet chips; and a plurality of bet result display sections 53 for indicating information concerning the previous bets of the player with the win or loss result confirmed in the preceding game in the same format as the bet display sections 52, as illustrated in FIG. 4.

A result number display section 54 indicating the four winning numbers with the roulette wheel 3 in the past is provided above the bet display sections 52.

The bet display sections 52 will be discussed. FIG. 5 is a schematic view illustrating the bet display section 52 of the second BET screen 33 according to the present embodiment.

The selected number display section 50 of the bet display section 52 is provided with four display sections of a first selected number display section 50A, a second selected number display section 50B, a third selected number display section 50C and a fourth selected number display section 50D from the left to the right facing the liquid crystal screen 29 (see FIG. 4 described above). A maximum of four numbers selected by the player using the number selection section 44 (see FIG. 4 described above) are displayed on the selected number display sections 50A to 50D.

Before numbers are selected, "?" marks are displayed on the selected number display sections 50A to 50D as illustrated in FIG. 4 described above. The player selects any of the selected number display sections 50A to 50D using a cursor 55 described later and selects any numbers through the number selection section 44, whereby the player-selected numbers are displayed on the selected number display sections 50A to 50D.

The number-of-chips display section 51 of the bet display section 52 displays a chip mark 141 indicating the number of bet chips on the four numbers at the maximum selected in the selected number display section 50. The number displayed on the chip mark 141 indicates the number of chips bet. For example, as illustrated in FIG. 4, when four numbers of "12", "21", "30" and "31" are displayed on the selected number display sections 50A to 50D and the chip mark 141 indicating "10" is displayed on the number-of-chips display section 51, it means that ten chips are bet on the numbers "12", "21", "30" and "31". Four games are executed with the roulette wheel 3 including the current game and when the four obtained winning numbers and the four selected numbers match, credit points are paid out to the player based on the number of identical number pairs.

Next, the bet result display sections 53 will be discussed. The bet result display section 53 indicates information concerning the bet of the player with the win or loss result confirmed in the preceding game. FIG. 6 is a schematic view illustrating the bet result display section 53 of the second BET screen 33 according to the present embodiment.

The bet result display section 53 has a similar composition to that of the bet display section 52 and is provided with a selected number display section 56 and a number-of-chips display section 57. Further, the bet result display section 53 is provided with a win result display section 58 for indicating whether or not a number selected by the player in the selected number display section 56 matches the winning number as a game result with the roulette wheel 3 (see FIG. 2 described above, etc.) to the left of the selected number display section 56.

The selected number display section 56 is provided with four display sections of a first selected number display section 56A, a second selected number display section 56B, a third selected number display section 56C and a fourth selected number display section 56D from the left to the right facing the liquid crystal screen 29 (see FIG. 4 described above). The four numbers at the maximum previously selected by the player using the number selection section 44 (see FIG. 4 described above) are displayed on the selected number display sections 56A to 56D.

An "X" mark 62 is displayed additionally to the selected number display sections 56A to 56D where the displayed number in each of the selected number display sections 56A to 56D does not match any numbers displayed in the result number display section 54 (see FIG. 4 described above), as illustrated in FIG. 6.

When the "X" mark 62 is displayed on all the numbers displayed in the selected number display sections 56A to 56D, namely, when none of the numbers selected by the player matches the numbers displayed in the result number display section 54, a character string of "Lose" is displayed in the win result display section 58 (see FIG. 4 described above). In this case, no award of credit points is paid out to the player and the chips bet and displayed on the number-of-chips display section 57 are lost.

The number-of-chips display section 57 of the bet result display section 53 displays the chip mark 141 indicating the number of bet chips on the four numbers at the maximum selected in the selected number display section 56. The number displayed on the chip mark 141 indicates the number of chips bet. For example, as illustrated in FIG. 4, when four numbers of "6", "6", "32" and "27" are displayed on the selected number display sections 56A to 56D and the chip mark 141 indicating "7" is displayed on the number-of-chips display section 57, it means that seven chips are bet on the numbers "6", "6", "32" and "27". Four games are executed with the roulette wheel 3 including the current game and when the four obtained winning numbers and the four selected numbers match, credit points are paid out to the player based on the number of identical number pairs.

Meanwhile, if there is at least one number on which no "X" mark 62 is displayed among the numbers displayed on the selected number display sections 56A to 56D, namely, when a number selected by the player matches one of the numbers displayed in the result number display section 54, a character string 60 of "Win" is displayed on the win result display section 58 (see FIG. 4 described above). Further, credit points (award credit, or odds) to be awarded to the player responsive to the number of the identical number pairs are displayed to the side of the character string 60.

Figures 15, 16:
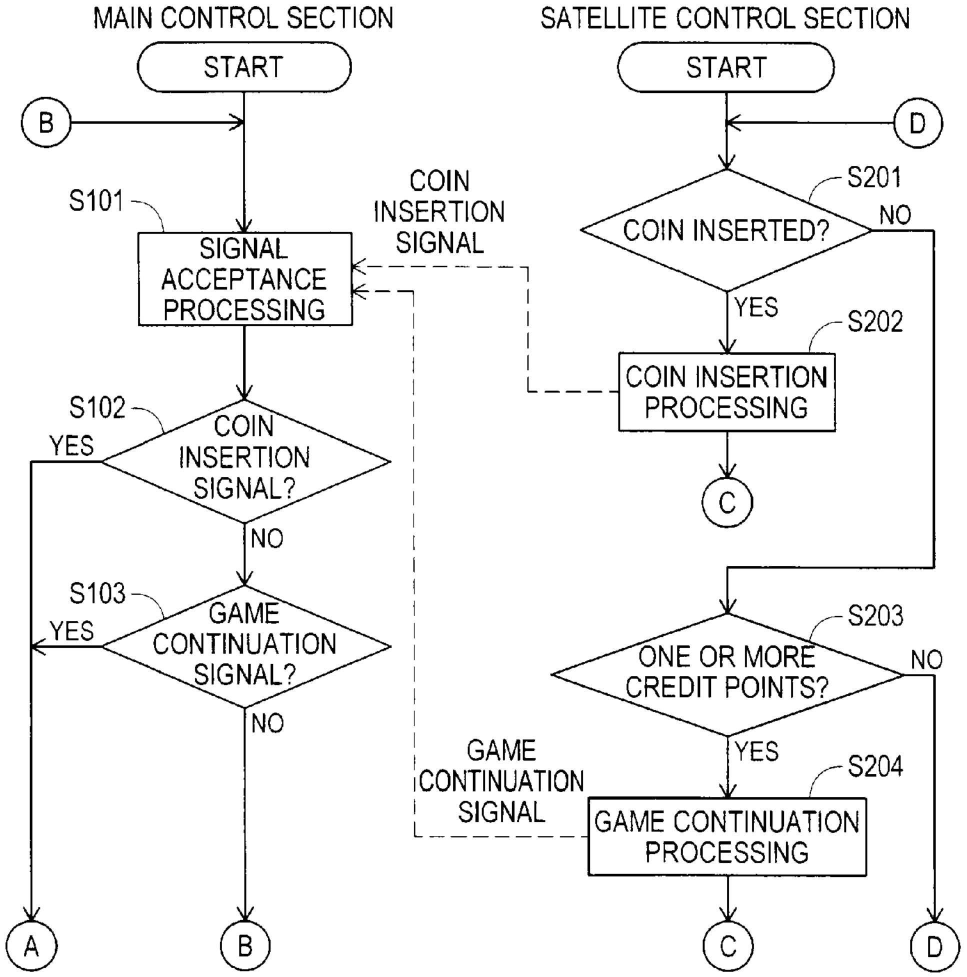
FIG. 15 is a view illustrating an award table according to the embodiment of the present invention.
FIG. 16 is a flowchart of a lotto-type roulette game processing program according to the embodiment of the present invention.

The award credit (odds) is determined according to award tables 61 and 161 (later described with reference to FIGS. 7 and 15) stored in ROM 81 (later described with reference to FIG. 9). FIG. 7 is a view illustrating the award table 61 according to the present embodiment. FIG. 15 is a view illustrating the award table 161 according to the present embodiment.

As illustrated in FIG. 7, the award credit (odds) paid out to the player in response to the number of identical number pairs is uniquely determined in the award table 61. Specifically, when all of the four numbers selected by the player in the selected number display section 56 match the four winning numbers, credit points of 2000 times as many chips as the chips bet in the number-of-chips display section 57 are paid out and are added to the current credit points owned by the player. When three of the numbers selected by the player in the selected number display section 56 match the winning numbers, credit points of 180 times as many chips as the chips bet in the number-of-chips display section 57 are paid out and are added to the current credit points owned by the player.

When two of the numbers selected by the player in the selected number display section 56 match the winning numbers, credit points of 15 times as many chips as the chips bet in the number-of-chips display section 57 are paid out and are added to the current credit points owned by the player. When one of the numbers selected by the player in the selected number display section 56 matches one of the winning numbers, no award of additional credit points is paid out to the player. When none of the four numbers selected by the player in the selected number display section 56 match the winning numbers, no award of additional credit points is paid out to the player.

When all the four numbers selected by the player in the selected number display section 56 are the same number, the award table 161 illustrated in FIG. 15 is used instead of the award table 61 illustrated in FIG. 7.

As illustrated in FIG. 15, the award credit (odds) paid out to the player in response to the number of identical number pairs is uniquely determined in the award table 161. Specifically, when all of the four winning numbers by the roulette wheel 3 match the four numbers selected by the player in the selected number display section 56, credit points of 20000 times as many chips as the chips bet in the number-of-chips display section 57 are paid out and are added to the current credit points owned by the player. When three of the winning numbers match the numbers selected by the player in the selected number display section 56, credit points of 500 times as many chips as the chips bet in the number-of-chips display section 57 are paid out and are added to the current credit points owned by the player. When two of the winning numbers match the numbers selected by the player in the selected number display section 56, credit points of 100 times as many chips as the chips bet in the number-of-chips display section 57 are paid out and are added to the current credit points owned by the player. When one of the winning numbers matches the numbers selected by the player in the selected number display section 56, credit points of five times as many chips as the chips bet in the number-of-chips display section 57 are paid out and are added to the current credit points owned by the player. When none of the winning numbers match the numbers selected by the player in the selected number display section 56, no award of additional credit points is paid out to the player.

Discussion will be given with reference to FIG. 4 again. The number selection section 44 will subsequently be discussed. The number selection section 44 includes 38 numeric buttons 63 of numbers "0", "00", and "1" to "36" displayed on the number indication plates 14 of the roulette wheel 3, and a cancel button 64 displayed as "Select Cancel". The player places the cursor 55 on any one of the selected number display sections 50A to 50D of the bet display section 52 and subsequently presses any numeric button 63 to select the number corresponding to the pressed numeric button 63. The player places the cursor 55 on the already selected number and subsequently presses the cancel button 64 to cancel the already selected number. Again, "?" mark is displayed in the one of the selected number display sections 50A to 50D where the number is canceled.

The result number display section 54 displays the game results with the roulette wheel 3 in the past four games and includes a first result number display section 54A displaying the winning number of the game result with the roulette wheel 3 in the immediately preceding game, a second result number display section 54B displaying the winning number of the game result with the roulette wheel 3 in the game before the preceding game, a third result number display section 54C displaying the winning number of the game result with the roulette wheel 3 in the two games before the preceding game and a fourth result number display section 54D displaying the winning number of the game result with the roulette wheel 3 in the three games before the preceding game. The player references the winning numbers displayed in the result number display section 54, whereby it is made possible for the player to easily determine whether or not the numbers displayed in the selected number display section 56 of the bet result display section 53 match the winning numbers.

The result history display section 45 lists the results of the winning numbers in the previous games (one game refers to an operation sequence from the player placing a bet in a usual roulette game using the first BET screen 31, the ball 16 falling in the ball housing groove 13 to paying out credit points based on the winning number). When one game is over, the new winning number is added to the top of the result history display section 35 for display and the player can check the history of the winning numbers of a maximum of sixteen games.

The screen switch button 46 is a button that allows the player to switch between the first BET screen 31 and the second BET screen 33 displayed on the image display 7 as mentioned above. Two character strings of "Roulette" and "Loto4" are displayed on the screen switch button 46. When the player presses the screen switch button 46 on the liquid crystal screen 29, the second BET screen 33 using the number selection betting board 32 is switched to the first BET screen 31 using the table betting board 30 for display, and vice versa. The player bets a chip based on the betting board on the currently displayed screen.

The betting unit selection buttons 47 are buttons each for betting a predetermined number of chips by units, such as by five chips or by ten chips, on the number-of-chips display section 51 specified by the player. The following four types of betting unit selection buttons 47 are included: 1-BET button 47A, 5-BET button 47B, 10-BET button 47C and 100-BET button 47D.

The player first selects four numbers at the maximum in the selected number display section 50 and then specifies the bet display section 52 to bet by pressing the number-of-chips display section 51 on the side of the selected number display section 50. The cursor 55 is placed on the specified number-of-chips display section 51. In this state, when the player presses the 1-BET button 47A, one chip is bet at a time (the number of bet chips increases in order of "1", "2", "3" and so on each time the player presses the 1-BET button 47A with a finger or the like). When the player presses the 5-BET button 47B, five chips are bet at a time (the number of bet chips increases in order of "5", "10", "15" and so on each time the player presses the 5-BET button 47B with a finger or the like). When the player presses the 10-BET button 47C, 10 chips are bet at a time (the number of bet chips increases in order of "10", "20", "30" and so on each time the player presses the 10-BET button 47C with a finger or the like). When the player presses the 100-BET button 47C, 100 chips are bet at a time (the number of bet chips increases in order of "100", "200", "300" and so on each time the player presses the 100-BET button 47D with a finger or the like). According to the above configuration, the betting operation is simplified even when betting a large number of chips.

The payback result display section 48 displays the number of bet chips of the player in the preceding game and the paid-back credit points. Here, subtracting the number of bet chips from the paid-back credit points results in the credit points newly gained by the player at the preceding game.

The credit points display section 49 displays the credit points presently owned by the player. When the player bets chips, the credit points are decremented by the number of the chips bet (one credit point per chip). If the number in the bet display section 52 on which a bet is placed matches the winning number and the credit based on the award table 61 or 161 is paid back, the credit points are incremented by the paid-back credit points. If the credit points owned by the player reach "0", the game is over.

A BET timer graph 65 is provided at a topmost position of the number selection betting board 32 of the second BET screen 33 as with the first BET screen 31 described above. The BET timer graph 65 is a graph for indicating the remaining time during which the player can bet, and a red graph extends gradually to the right with the passage of time from the bet start time. When the graph extends to the rightmost side, the time during which the player can bet in the current game expires. When the bet period of the player at each satellite 4 expires, namely, when the BET timer graph 65 reaches the rightmost side, the ball discharging unit 85 (see FIG. 9 described later) throws the ball 16 onto the roulette wheel 3.

The cursor 55 provided for indicating one of selected number display sections 50A to 50D and a number-of-chips display section 51 is displayed on the number selection betting board 32. A chip mark 141 provided for indicating the number of bet chips and the bet display section 52 so far is also displayed on the number selection betting board 32. The number displayed on the chip mark 141 denotes the number of chips bet. For example, the chip mark 141 displayed with "10" placed on the bet display section 52 where "12", "21", "30" and "31" are selected as illustrated in FIG. 4 indicates that the player bets ten chips on the four numbers "12", "21", "30" and "31".

To place a bet on the second BET screen 33 described above, the player first specifies and presses any of the selected number display sections 50A to 50D where "?" mark is displayed, of the bet display section 52 on the screen directly with a finger. Consequently, the cursor 55 moves to the specified one of the selected number display sections 50A to 50D.

Then, the player presses a numeric button 63 on which any desired number is displayed in the number selection section 44, thereby specifying the number. After specifying numbers in maximum four selected number display sections 50A to 50D, the player presses the number-of-chips display section 51 provided to the side of the selected number display sections 50A to 50D. Subsequently, whenever the player presses one of the betting unit selection buttons 47 (1-BET button 47A, 5-BET button 47B, 10-BET button 47C and 100-BET button 47D), as many chips as the number indicated by the betting unit selection button are bet on the number-of-chips display section 51 of the bet display section 52 specified. For example, when the player presses the 10-BET button 47C four times, the 5-BET button 47B once, and the 1-BET button 47A three times, a total of forty-eight chips are bet.

The second BET screen 33 also displays same result prediction buttons 201. The same result prediction buttons 201 includes three number-of-times buttons 201A, 201B and 201C, a repeat button 201D and a cancel button 201E.

The number-of-times button 201A is a button to be pressed when the player specifies the same number twice in a row. The player is to press the number-of-times button 201A before pressing a numeric button 63. As a result, the same number as the number displayed on the numeric button 63 subsequently pressed is displayed on adjacent two of the selected number display sections 50A to 50D.

The number-of-times button 201B is a button to be pressed when the player specifies the same number three times in a row. The player is to press the number-of-times button 201B before pressing a numeric button 63. As a result, the same number as the number displayed on the numeric button 63 subsequently pressed is displayed on adjacent three of the selected number display sections 50A to 50D.

The number-of-times button 201C is a button to be pressed when the player specifies the same number four times in a row. The player is to press the number-of-times button 201C before pressing a numeric button 63. As a result, the same number as the number displayed on the numeric button 63 subsequently pressed is displayed, on adjacent four of the selected number display sections 50A to 50D.

Figure 23:
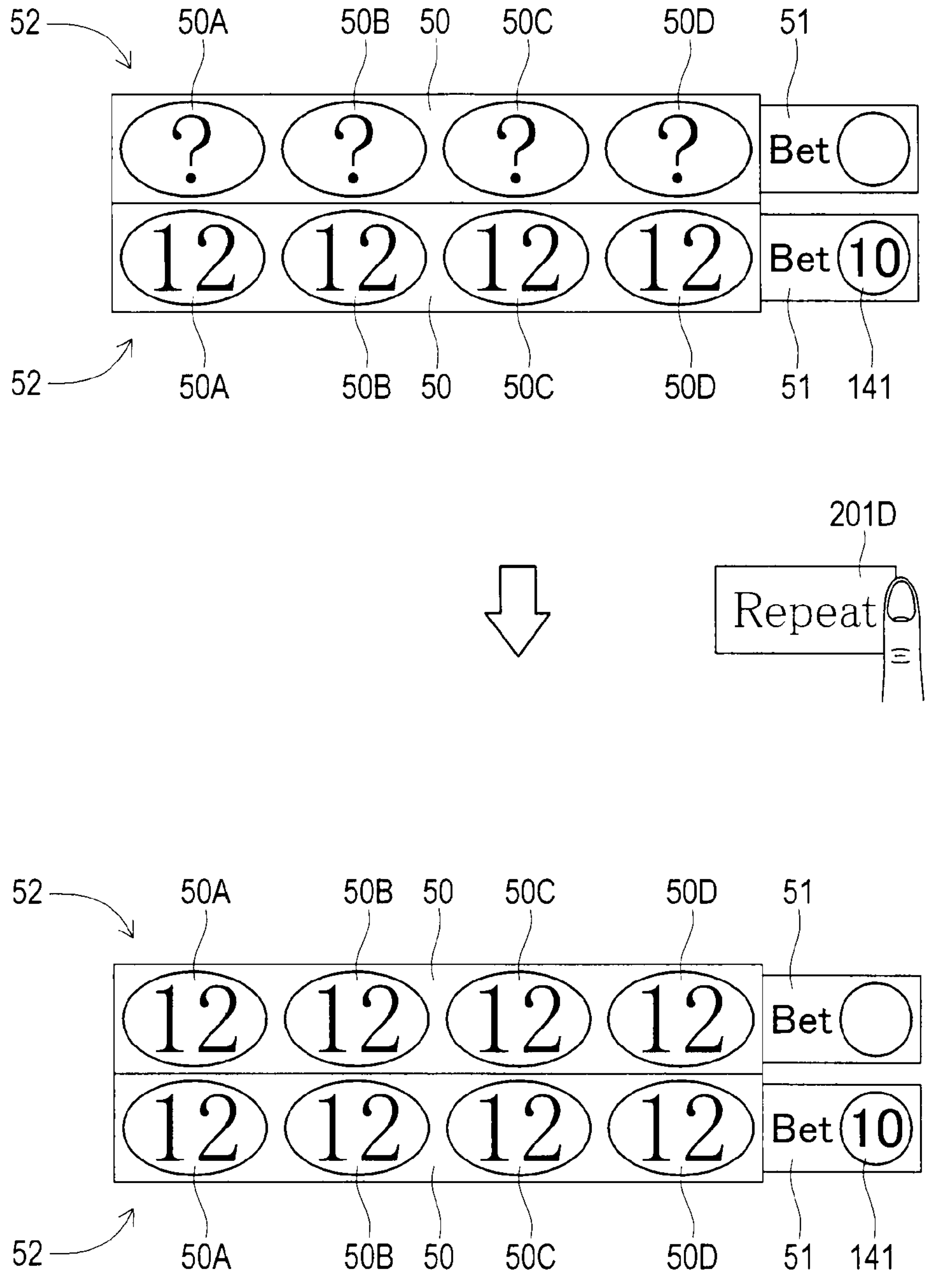
FIG. 23 is a schematic view illustrating a bet result display section of the second BET screen according to the embodiment of the present invention.

The repeat button 201D is a button to be pressed when the player specifies the whole set of numbers displayed on the formerly-specified selected number display section 50. The player is to press the repeat button 201D without pressing any numeric button 63. As a result, a set of numbers identical to the whole set of numbers displayed on the formerly-specified selected number display section 50 is displayed on the currently-specified selected number display section 50 (see FIG. 23 described later).

The cancel button 201E is a button to be pressed when the player cancels the operations on a same result prediction button 201. When the player presses the cancel button 201E, operations on the three number-of-times buttons 201A, 201B and 201C and the repeat button 201D are canceled.

As described above, the player presses the screen switch button 34, 46 for switching between the first BET screen 31 provided with the usual table betting board 30 and the second BET screen 33 provided with the new number selection betting board 32 for display.

In a lotto-type roulette game using the second BET screen 33, the player predicts the game results with the roulette wheel 3 in the maximum four games including the current game and select maximum four numbers at a time from among the numbers displayed on the number indication plates 14 of the roulette wheel 3 (38 numbers of "0", "00" and "1" to "36") using the number selection section 44 and can receive payout of credit points based on the number of the selected numbers matching the winning numbers from the game results, so that the player can play a new lotto-type roulette game in addition to a usual roulette game in one roulette gaming machine 1 and the variety of game plays can be increased. In the lotto-type game with the second BET screen 33, the credit point payout is determined based on the maximum four game results including the current game with the roulette wheel 3, so that the player can feel a sense of anticipation to a game over a long period of time and can continue to have interest in the game.

[Configuration of Coin Acceptance Unit]

Figure 8:
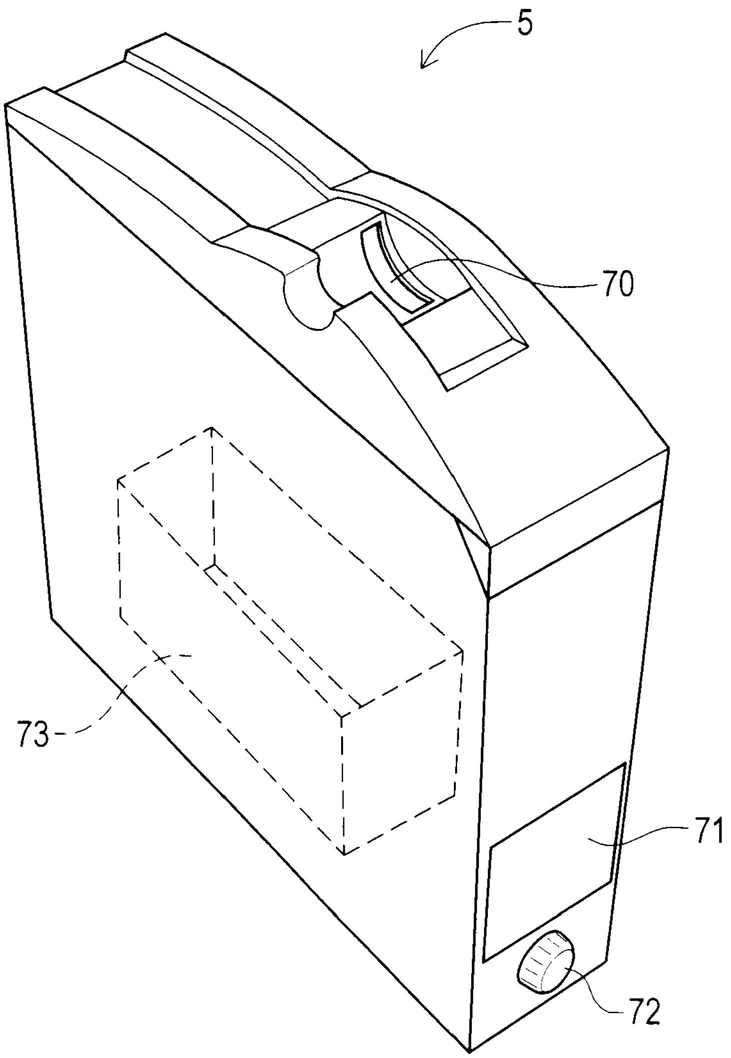
FIG. 8 is a perspective view illustrating a coin acceptance unit according to the embodiment of the present invention.

Next, the configuration of the coin acceptance unit 5 according to the present embodiment will be discussed with FIG. 8. FIG. 8 is a perspective view illustrating the coin acceptance unit 5 according to the present embodiment.

As illustrated in FIG. 8, the coin acceptance unit 5 is a unit substantially shaped like a rectangular parallelepiped in which game media such as coins and tokens are input and accepted. The credit points responsive to the accepted game media are added to the credit points owned by the player and the update is displayed in the credit point display section 38 or 49 (see FIGS. 3 and 4 described above).

The coin acceptance unit 5 is provided with a coin insertion slot 70 for inputting game media such as coins and tokens, a coin return opening 71 for returning inputted coins and the like to the player, and a key insertion slot 72 to be used when opening and closing the inside of the coin acceptance unit 5.

The key insertion slot 72 is an insertion slot of a key (not illustrated) for opening and closing a door (not illustrated)

provided on the coin acceptance unit 5. When a predetermined key is inserted and is turned in a predetermined direction, the lock state of a locking unit is released and the door is opened. A coin storage section 73 for storing input coins is installed in the coin acceptance unit 5. As the door is opened, the coins in the coin storage section 73 can be collected. Further, it is also made possible to conduct internal maintenance.

[Configurations of Circuits Provided for Roulette Gaming Machine]

<Configuration of Control System of Roulette Gaming Machine>

Next, the configuration of a control system of the roulette gaming machine 1 will be discussed based on FIG. 9. FIG. 9 is a block diagram to schematically illustrate the control system of the roulette gaming machine 1.

Figure 9:
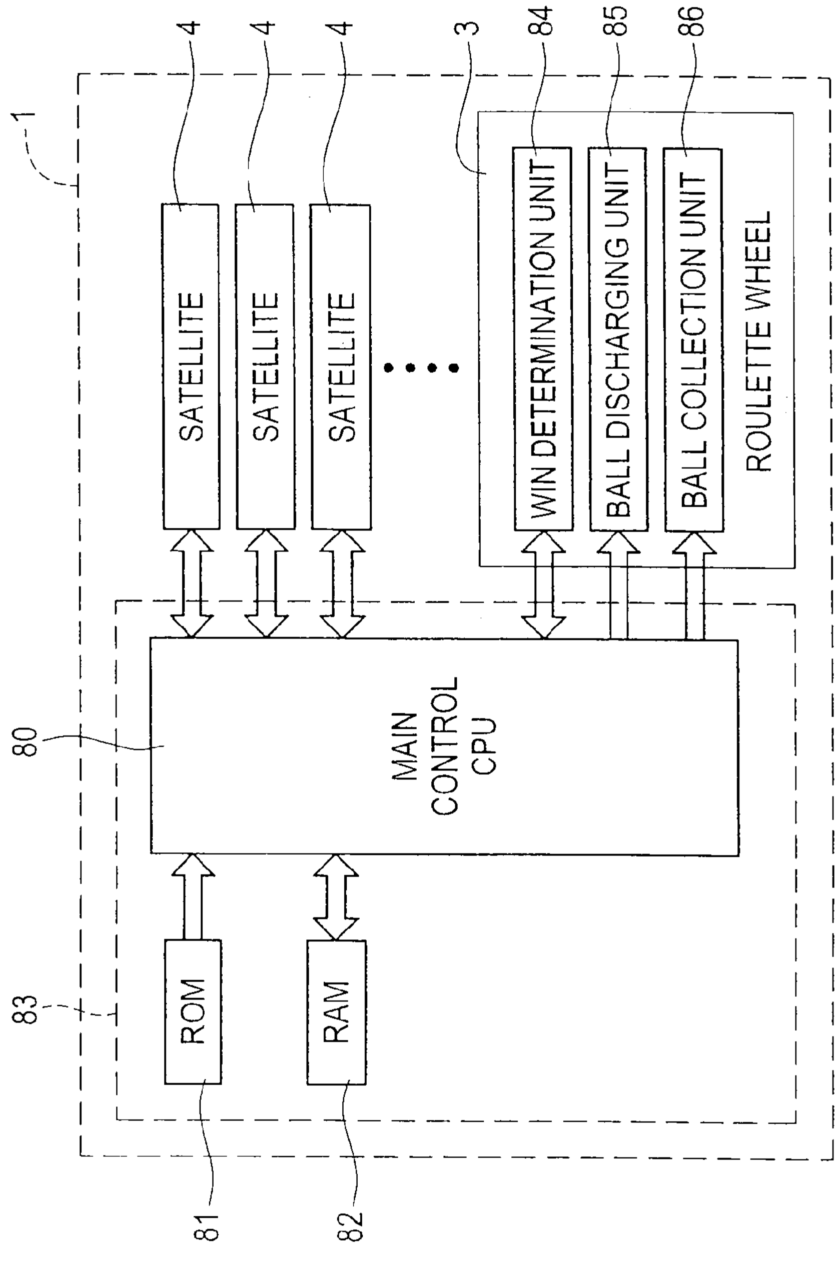
FIG. 9 is a block diagram schematically illustrating a control system of a roulette gaming machine according to the embodiment of the present invention.

As illustrated in FIG. 9, the roulette gaming machine 1 is provided with a main control section 83 including a main control CPU 80, ROM 81 and RAM 82, and the roulette wheel 3 and the ten satellites 4 connected to the main control section (see FIG. 14 described above). The control system of the satellites 4 is described later in detail.

The main control CPU 80 performs various types of processing based on input signals supplied from the satellites 4 and data and programs stored in the ROM 81 and the RAM 82, and transmits instruction signals to the satellites 4 based on the processing result, thereby controlling the satellites 4 under the initiative of the main control CPU 80 for performing games. Further, the main control CPU 80 controls a win determination unit 84, a ball discharging unit 85 and a ball collection unit 86 installed in the roulette wheel 3 for inputting the ball 16 onto the roulette wheel 3, collecting the ball 16 from the roulette wheel 3, and determining the winning number corresponding to the ball housing groove 13 into which the ball 16 falls. The main control CPU 80 makes a win or loss determination of bet chips based on the obtained winning number and bet information transmitted from each satellite 4 and calculates the credit points to be paid out to the player at the satellite 4.

The ROM 81 is implemented as semiconductor memory, for example, and stores a program for providing the basic function of the roulette gaming machine 1, a program for controlling the units in the roulette wheel 3, the odds (the award credit points per chip responsive to a win) for a usual roulette game using the first BET screen 31, the award tables 61 and 161 for the number of identical number pairs in a lotto-type roulette game using the second BET screen 33 (see FIGS. 7 and 15 described above), a program for controlling the satellites 4 under the initiative of the main control CPU 80 and the like.

Meanwhile, the RAM 82 temporarily stores a first progressive jackpot fund, a second progressive jackpot fund, bet information supplied from the satellites 4, a winning number of the roulette wheel 3 determined by the win determination unit 84, data concerning the result of the processing executed by the main control CPU 80 and the like.

The win determination unit 84, the ball discharging unit 85 and the ball collection unit 86 provided for the roulette wheel 3 are also connected to the main control CPU 80. When the bet time of the player at each satellite 4 expires, namely, when the BET timer graph 39 of the first BET screen 31 or 65 of the second BET screen 33 reaches the rightmost side, the ball discharging unit 85 is driven and throws the ball 16 onto the roulette wheel 3.

Further, when the revolving speed of the ball 16 gradually reduces and the ball 16 loses the centrifugal force, rolls down the slope of the frame 11 and is housed in any one of the ball housing grooves 13, the win determination unit 84 is driven and determines the number described on the number indication plate 14 corresponding to the ball housing groove 13 in which the ball 16 is housed and transmits the determination result to the main control CPU 80. Then, the ball collection unit 86 is driven for collecting the ball 16 from the surface of the roulette wheel 3.

Figure 11:
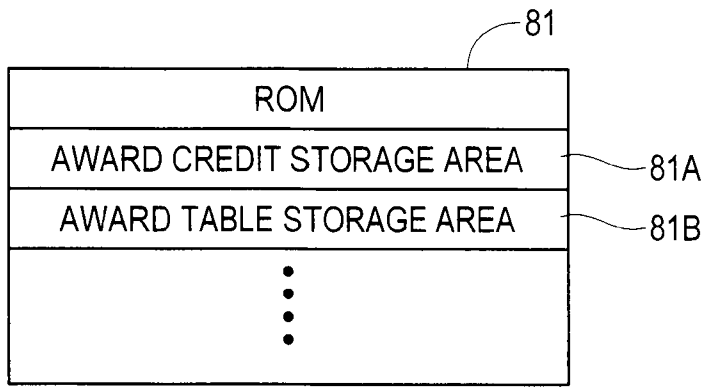
FIG. 11 is a schematic view illustrating storage areas of ROM of the roulette gaming machine according to the embodiment of the present invention.

As illustrated in FIG. 11, the ROM 81 is provided with an award credit storage area 81A storing the odds concerning a usual roulette game using the first BET screen 31 and an award table storage area 81B storing the award tables 61 and 161 storing the odds concerning a lotto-type roulette game using the second BET screen 33 (see FIGS. 7 and 15 described above). As the odds for each BET area 42 of the first BET screen 31 stored in the award credit storage area 81A, a "2-fold" to "36-fold" award is given depending on the bet method (straight up, corner bet, split bet, etc). Meanwhile, as the odds in the award table 61 stored in the award table storage area 81B, a "15-fold" to "2000-fold" award is given depending on the number of identical number pairs as described above. Further, as the odds in the award table 161 stored in the award table storage area 81B, a "5-fold" to "20000-fold" award is given depending on the number of identical number pairs as described above.

Figure 12:
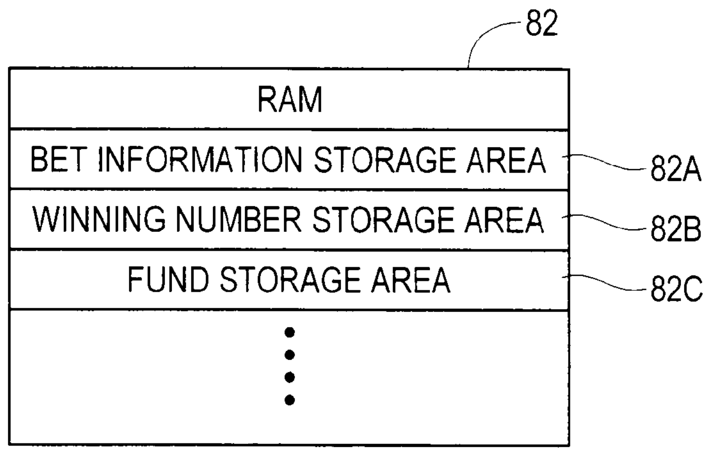
FIG. 12 is a schematic view illustrating storage areas of RAM of the roulette gaming machine according to the embodiment of the present invention.

Also, as illustrated in FIG. 12, the RAM 82 is provided with a bet information storage area 82A for storing the bet information of the player playing a game at present, a winning number storage area 82B for storing a winning number of the roulette wheel 3 determined by the win determination unit 84 and a fund storage area 82C storing the first progressive jackpot fund and the second progressive jackpot fund. The bet information may specifically include a BET area 42 and the number of bet chips specified on the first BET screen 31 and the maximum four numbers and the number of bet chips specified on the second BET screen 33.

<Control System of Satellite>

Figure 10:
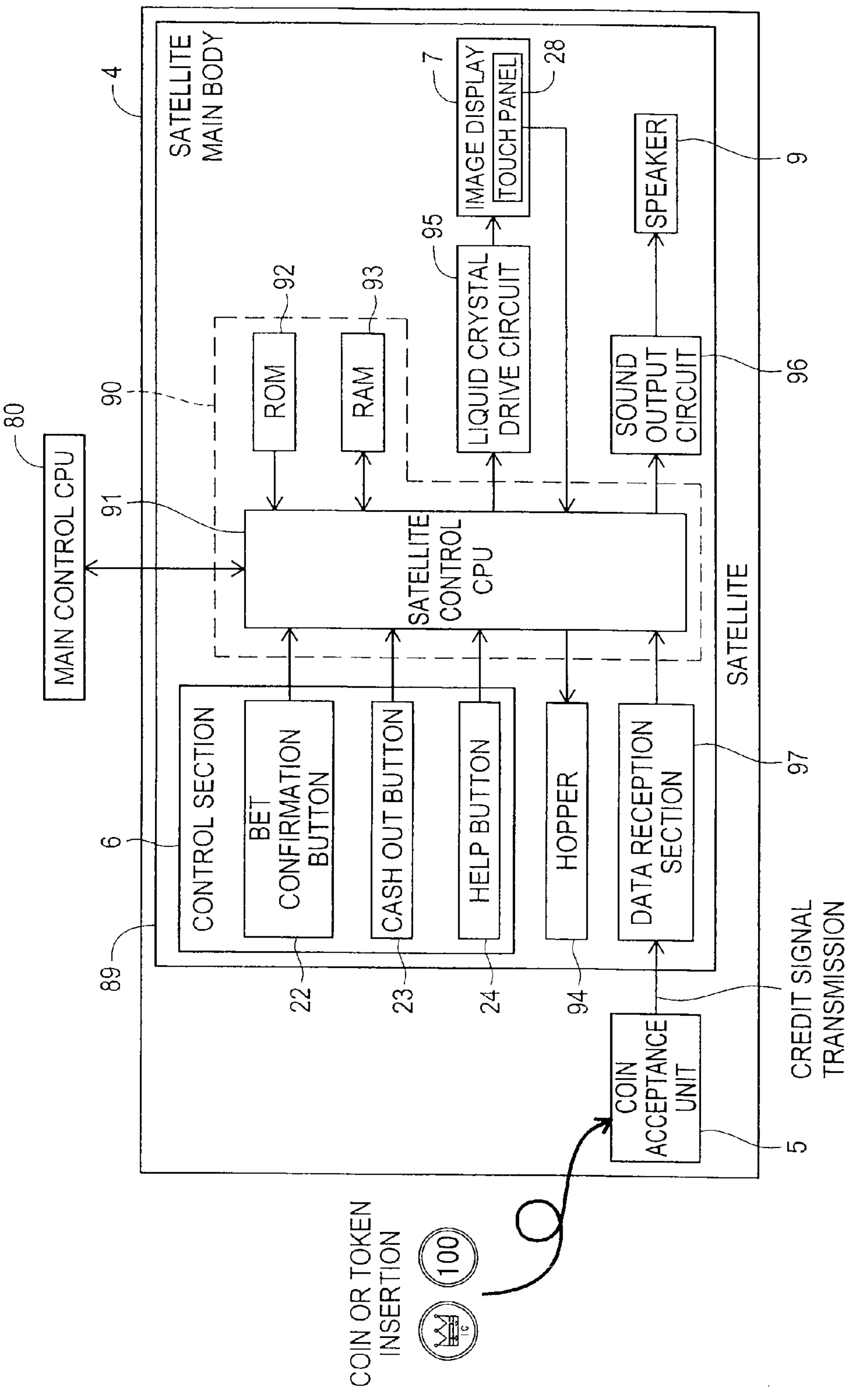
FIG. 10 is a block diagram schematically illustrating a control system of a satellite according to the embodiment of the present invention.

Next, the configuration of the control system of a satellite 4 connected to the main control CPU 80 of the main control section 83 will be discussed based on FIG. 10. FIG. 10 is a block diagram schematically illustrating the control system of the satellite 4 according to the present embodiment. The ten satellites 4 basically have the same configuration and therefore in the description to follow, one satellite 4 is taken as an example.

As illustrated in FIG. 10, the satellite 4 is basically including a main body 89 in which the image display 7 and the like are installed and the coin acceptance unit 5 attached to the main body 89. Further, the main body 89 includes a satellite control section 90 and several peripheral machines. The satellite control section 90 includes a satellite control CPU 91, ROM 92 and RAM 93. The ROM 92 is implemented as semiconductor memory, for example, and stores a program for providing the basic function of the satellite 4, various programs required for controlling the satellite 4, a data table and the like. The RAM 93 is memory for temporarily storing various pieces of data on which operations are performed by the satellite control CPU 91, the current credit points owned by the player, the bet state of chips by the player, and the like.

The BET confirmation button 22, the cash out button 23, and the help button 24 placed on the control section 6 (see FIG. 14 described above) are connected to the satellite control CPU 91. Based on an operation signal output as each button is pressed, etc., the satellite control CPU 91 controls the satellite 4 to execute the corresponding operation. Specifically, the satellite control CPU 91 executes processing based on an input signal supplied from the control section 6 in response to entry of operation of the player and the data and the programs stored in the ROM 92 and the RAM 93, and transmits the processing result to the main control CPU 80 of the main control section 83 described above.

Meanwhile, the satellite control CPU 91 controls the peripheral machines making up the satellite 4 to carry out the roulette game in the satellite 4, through receiving an instruction signal from the main control CPU 80. Alternatively, the satellite control CPU 91 controls the peripheral machines making up the satellite 4 to carry out the roulette game in the satellite 4, through executing processing based on an input signal supplied from the control section 6 in response to entry of operation of the player, operation information of the touch panel 28 and the data and the programs stored in the ROM 92 and the RAM 93. Which type of processing is to be performed is determined for each processing responsive to the content of the processing. For example, coin payout processing responsive to a winning number corresponds to the former type of processing and processing with respect to bet operation of the player on the first BET screen 31 or the second BET screen 33 corresponds to the latter type of processing.

A hopper 94 is also connected to the satellite control CPU 91. The hopper 94 pays out a predetermined number of coins to the player from the coin payout opening 8 (see FIG. 14 described above) in response to an instruction signal from the satellite control CPU 91.

The image display 7 is connected via a liquid crystal drive circuit 95 to the satellite control CPU 91. The liquid crystal drive circuit 95 includes program ROM, image ROM, an image control CPU, work RAM, a VDP (video display processor), and video RAM. The program ROM stores an image control program and various selection tables concerning display on the image display 7. The image ROM stores dot data to form images to be displayed on the image display 7. The image control CPU determines the image to be displayed on the image display 7 from the dot data previously stored in the image ROM in accordance with the image control program previously stored in the program ROM based on a parameter set in the satellite control CPU 91. The work RAM is implemented as temporary storage for the image control CPU to execute the image control program. The VDP forms an image responsive to the display determined by the image control CPU and outputs the image to the image display 7. The video RAM is implemented as temporary storage for the VDP to form an image.

The touch panel 28 is attached to the front of the image display 7 as mentioned above, and operation information of the touch panel 28 is transmitted to the satellite control CPU 91. Through the touch panel 28, the player bets chips on the first BET screen 31 or the second BET screen 33. Specifically, the player operates the touch panel 28 in selecting the BET area 42, operating the screen switch button 34, 46 and the betting unit selection button 36, 47, moving the cursor 55 to the selected number display sections 50A to 50D and the number-of-chips display section 51, pressing the numeric button 63, pressing a same result prediction button 201, and the like, and touch panel operation information is transmitted to the satellite control CPU 91. Based on the information, the bet information of the current player (the BET areas 42 and the number of bet chips specified on the first BET screen 31 and the maximum four numbers and the number of bet chips, etc. specified on the second BET screen 33) is stored in the RAM 93 whenever necessary. The bet information is transmitted to the main control CPU 80 and is stored in the bet information storage area 82A of the RAM 82.

Further, a sound output circuit 96 and the above-mentioned speaker 9 are connected to the satellite control CPU 91. The speaker 9 generates various effect sounds in producing various effects based on output signals from the sound output circuit 96.

A data reception section 97 is also connected to the satellite control CPU 91 and further the coin acceptance unit 5 is connected to the data reception section 97. The coin acceptance unit 5 is a unit into which the player inputs game media such as coins and game tokens in playing a game, as mentioned above.

The data reception section 97 receives a credit signal transmitted from the coin acceptance unit 5. The credit signal is information concerning the additional credit points based on the game media such as coins, game tokens, etc., input into the coin acceptance unit 5. The satellite control CPU 91 increments the credit points of the player stored in the RAM 93 based on the received credit signal.

[Contents of Program]

Subsequently, main processing programs in the roulette gaming machine 1 will be discussed based on drawings.

<Program for Usual Roulette Game>

First, a game processing program for a usual roulette game using the first BET screen 31 will be discussed. FIG. 13 is a flowchart of the game processing program for a usual roulette game using the first BET screen 31 in the roulette gaming machine 1. The program illustrated in the flowchart of FIG. 13 is stored in the ROM 81 and the RAM 82 included in the roulette gaming machine 1 and is executed by the main control CPU 80.

First, at step (abbreviated as "S" hereinafter) 1, the main control CPU 80 determines whether or not the player owns one or more credit points. In the roulette gaming machine 1 according to the present embodiment, when a game token or a coin is input into the coin acceptance unit 5 at any of the satellites 4, a coin input signal is sent from the satellite control section 90 of the satellite 4 to the main control section 83. According to the signal, the main control CPU 80 determines the input of the game token or the coin and increments the credit points owned by the player. The credit points incremented by the CPU 80 according to the number of input game tokens or coins, are recorded by the satellite control section 90 in the RAM 93 as credit data indicative of the credit points. If no credit point is owned by the player (NO at S1) a wait mode is entered until the game token or the coin is input. Meanwhile, if one or more credit points are owned by the player (YES at S1), the process proceeds to S2.

The first BET screen 31 illustrated in FIG. 3 is displayed on the image display 7 of the satellite 4 used by the player, enabling the player to bet a chip. Other players can enter the game at midpoint and the roulette gaming machine 1 according to the present embodiment allows a maximum of ten players at a time to play a game.

When the first player entering the game inputs a game token or a coin, the bet period in which each player can place a bet is started (S2). If the current game follows the preceding game, the bet period is started immediately after the preceding game is over. Each player entering the game can operate the touch panel 28 during the bet period to bet his or her chip on a BET area 42 corresponding to a number he or she predicts (see FIG. 3 described above). The specific bet method using the first BET screen 31 is already described and therefore will not be discussed again.

Next, whether or not the bet period expires is determined at S3. The bet period is displayed with the BET timer graph 39. When the bet period starts (S2), the red graph starts to extend to the right gradually. When the red graph extends to the rightmost side, the bet period in the current game expires.

Before the bet period expires (NO at S3), a bet is accepted. If the bet period expires (YES at S3), a bet end signal is output to the satellite control sections 90 of all satellites 4 and an image to the effect that the bet period expires is displayed on the liquid crystal screen 29 of each satellite 4, disabling each player from performing bet operation on the touch panel 28. The bet information (source address, specified BET area 42 and the number of bet chips on the specified BET area 42) is received (S4) of the player at each satellite 4 and is stored in the bet information storage area 82A of the RAM 82.

Next, the main control section 83 executes game processing with the roulette wheel 3 in accordance with a game execution program. First, at S5, the ball discharging unit 85 throws the ball 16 onto the roulette wheel 3. The thrown ball 16 rolls on the roulette wheel 3 along the guide wall 18. Then, when the rotation speed reduces and the centrifugal force is lost, the ball 16 rolls down the slope of the frame 11 and goes to the inside thereof and arrives at the rotating rotation disk 12 (see FIG. 2 described above).

The ball 16 rolling to the rotation disk 12 further passes through the surfaces of the number indication plates 14 outside the rotating rotation disk 12 and is housed in any one of the ball housing grooves 13, and the number described on the number indication plate 14 corresponding to the ball housing groove 13 in which the ball 16 is housed (any one of "0", "00", "1" to "36") becomes the winning number.

Subsequently, after the ball 16 is housed in the ball housing groove 13, the main control CPU 80 drives the win determination unit 84 for identifying to which number the ball housing groove 13 in which the ball is housed corresponds (S6).

Further, from the bet information at each satellite 4 received at S4 and the winning number determined at S6, the main control CPU 80 determines whether or not the chip bet at each satellite 4 wins (S7).

Based on the win or loss determination at S7, whether or not at least one chip bet at one satellite 4 wins is determined (S8). If it is determined that the at least one chip bet at one satellite 4 wins (YES at S8), the main control CPU 80 executes award calculation processing (S9). In the award calculation processing, the winning chip is recognized for each satellite 4 and the total award amount of credit to be paid out at each satellite 4 is calculated using the odds (the credit points to be paid out per chip) for each BET area 42 stored in the award credit storage area 81A of the ROM 81. Subsequently, the process proceeds to S10.

Meanwhile, if it is determined that none of the chips bet at the satellite 4 wins (NO at S8), the process proceeds to S11.

At S10, credit payout processing is executed based on the award calculation processing at S9. To pay out credit to the winning satellite 4, the main control section 83 outputs the credit data corresponding to the award amount to the satellite control section 90 of the winning satellite 4. The credit data is added to the RAM 93 of the winning satellite 4.

At S11, the ball collection unit 86 installed below the rotation disk 12 is driven for collecting the ball 16 on the rotation disk 12. The collected ball 16 will again be thrown onto the roulette wheel 3 in the later game. Following S11, the process proceeds to S12.

At S12, whether or not at least the player continues to play a game at one satellite 4 is determined. To quit playing another game, usually the player presses the cash out button 23. If the cash out button 23 is pressed, as many coins as the number responsive to the credit points (usually, one coin per one credit point) owned by the player at present gained by playing the game are paid back to the player from the coin payout opening 8.

If the player at any satellite 4 continues to play a game (NO at S12), the process returns to S2 and another bet period is started for starting another game.

Meanwhile, if the players at all satellites 4 quit playing a game (YES at S12), the roulette game processing is terminated.

<Processing for Lotto-Type Roulette Game>

Next, a game processing program for a lotto-type roulette game using the second BET screen 33 will be discussed. FIGS. 1, 16, 17, 18 and 19 are flowcharts of the game processing program for a lotto-type roulette game using the second BET screen 33 in the roulette gaming machine 1. The program illustrated in the flowchart of one of FIGS. 1, 16, 17 and 18 is stored in the ROM 81 and the RAM 82 included in the roulette gaming machine 1 and is executed by the main control CPU 80. Further, the program illustrated in the flowchart of one of FIGS. 1, 16 and 19 is stored in the ROM 92 and the RAM 93 included in a satellite 4 of the roulette gaming machine 1 and is executed by the satellite control CPU 91.

Each of the satellites 4 cooperates with the main control section 83 to perform the similar game operations. However, to avoid complication, one satellite 4 is illustrated in FIGS. 1 and 16 as an example.

First, at S201 in FIG. 16, the satellite control CPU 91 determines whether or not a game token or a coin is input by the player. In each satellite 4 of the roulette gaming machine 1 according to the present embodiment, when a game token or a coin is input into the coin acceptance unit 5, the satellite control CPU 91 determines the input of the game token or the coin and increments the credit points owned by the player. The credit points incremented by the satellite control CPU 91 according to the number of input game tokens or coins, is recorded in the RAM 93 as the credit data indicative of the credit points. If no game token or coin is input by the player (NO at S201), the process proceeds to S203 described later. Meanwhile, if a game token or coin is input by the player (YES at S201), the process proceeds to S202.

At S202, the satellite control CPU 91 performs coin insertion processing. In this processing, the satellite control CPU 91 transmits a coin insertion signal to the main control section 83. Then the process proceeds to S211 in FIG. 1.

Meanwhile, at S203 in FIG. 16, the satellite control CPU 91 determines whether or not the player owns one or more credit points. To quit playing another game, usually the player presses the cash out button 23. If the cash out button 23 is pressed, as many coins as the number responsive to the credit points (usually, one coin per one credit point) owned by the player at present gained by playing the game are paid back to the player from the coin payout opening 8. Accordingly, the determination is made based on the credit data stored in the RAM 93. If no credit point is owned by the player (NO at S203), the process returns to S201. If one or more credit points are owned by the player (YES at S203), the process proceeds to S204.

At S204, the satellite control CPU 91 performs game continuation processing. In the processing, the satellite control CPU 91 transmits a game continuation signal to the main control section 83. Following S204, the process proceeds to S211 in FIG. 1.

At the same time, the main control CPU 80 performs signal reception processing at S101 in FIG. 16. In the processing, the main control CPU 80 receives a coin insertion signal or a game continuation signal transmitted from one of the satellites 4. Then, the process proceeds to S102.

At S102, the main control CPU 80 determines whether or not a coin insertion signal is received. If a coin insertion signal is received (YES at S102, the process proceeds to S111 in FIG. 1. If no coin insertion signal is received (NO at S102), the process proceeds to S103 in FIG. 16.

At S103, the main control CPU 80 determines whether or not a game continuation signal is received. If no game continuation signal is received (NO at S103), the process returns to S101. If a game continuation signal is received (YES at S102), the process proceeds to S111 in FIG. 1.

At S111 in FIG. 1, the main control CPU 80 transmits a bet period start signal to all the satellites 4. Then, the process proceeds to S112.

At S112, the main control CPU 80 determines whether or not the current bet period expires. Here, the current bet period denotes a time period from transmission of a bet period start signal until the elapse of a certain length of time. If the current bet period has not expired (NO at S112), a wait mode is entered until the current bet period expires. If the current bet period has expired (YES at S112), the process proceeds to S113.

At S113, the main control CPU 80 transmits a bet end signal to all the satellites 4. Then, the process proceeds to S114.

At S114, the main control CPU 80 determines whether or not bet information transmitted from any one of the satellites 4 is received. Here, if no bet information is received (NO at S114), a wait mode is entered until bet information is received. If bet information is received (YES at S114), the process proceeds to S115.

At S115, the main control CPU 80 performs bet information processing. In the processing, the main control CPU 80 stores all the bet information currently received in the bet information storage area 82A in the RAM 82. Then, the process proceeds to S116 in FIG. 1.

Figure 24:
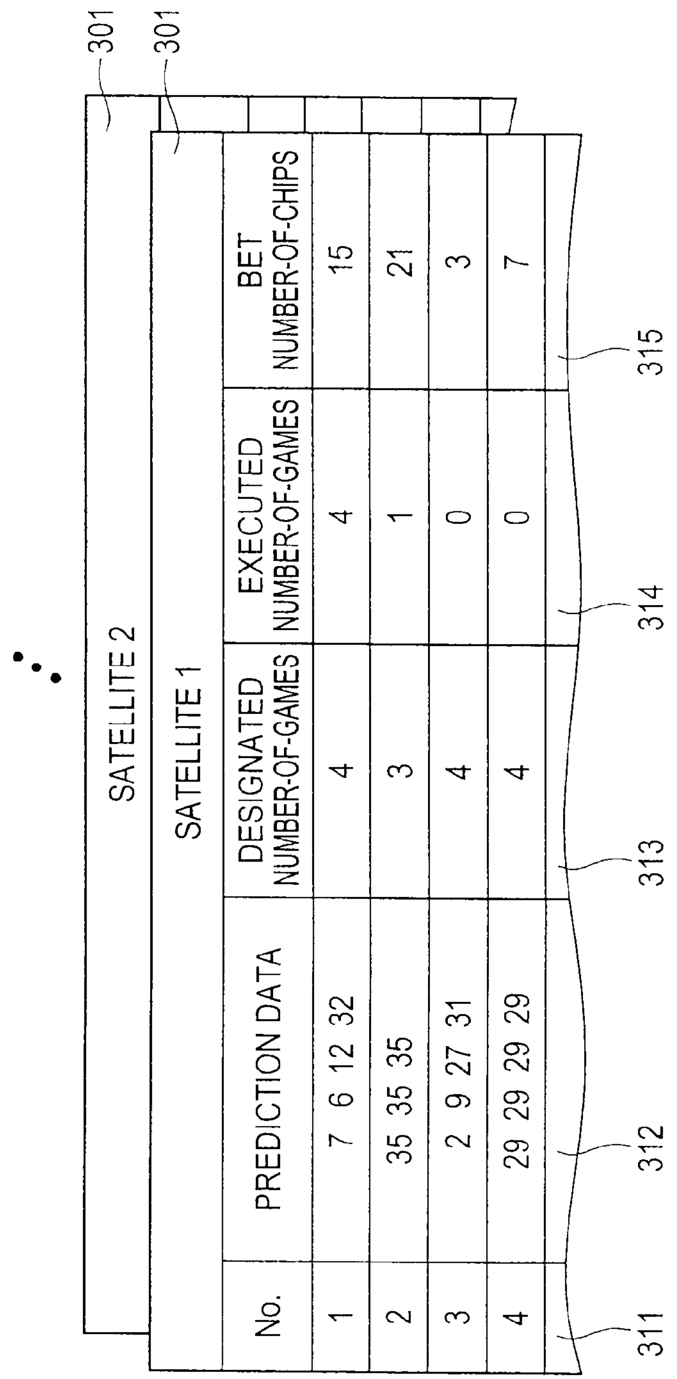
FIG. 24 is a schematic view illustrating files stored in a bet information storage area according to the embodiment of the present invention.

As illustrated in FIG. 24, a plurality of files 301 are formed in the bet information storage area 82A, and the plurality of files are corresponding respectively to the satellites 4. Each file 301 includes an item number field 311, a prediction data field 312, a designated number-of-games field 313, an executed number-of-games field 314 and a bet number-of-chips field 315.

The main control CPU 80 stores the received bet information in the bet information storage area 82A of the RAM 82 through the following processes.

First, the main control CPU 80 refers to the source address included in the bet information currently received and identifies the file 301 corresponding to the satellite 4 of the source address. Further, the main control CPU 80 identifies, from among all item numbers stored in the item number field 311 of the identified file 301, an item number whose corresponding fields 312, 313, 314 and 315 are all free space.

Next, the main control CPU 80 stores the selected numbers included in the received bet information in the prediction data field 312 corresponding to the identified item number.

Further, the main control CPU 80 counts the selected numbers included in the received bet information. The counted value is stored in the designated number-of-games field 313.

Further, the main control CPU 80 stores a value “0” in the executed number-of-games field 314 corresponding to the identified item number.

Further, the main control CPU 80 stores the number of chips included in the received bet information in the bet number-of-chips field 315 corresponding to the identified item number.

Figure 17:
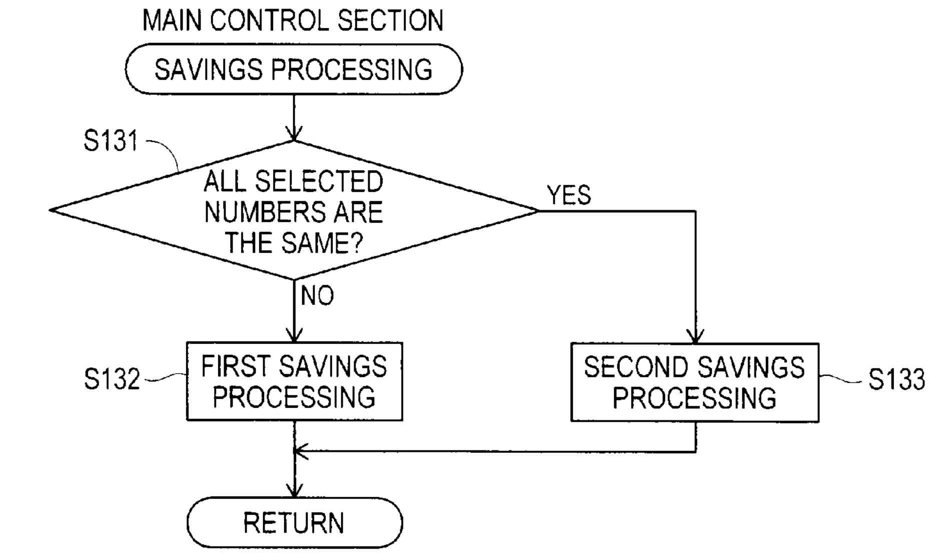
FIG. 17 is a flowchart of a lotto-type roulette game processing program according to the embodiment of the present invention.

At S116 referring back to FIG. 1, the main control CPU 80 performs savings processing. FIG. 17 is a flowchart of savings processing program. In the processing, the main control CPU 80 determines at S131 whether or not all the four selected numbers included in the received bet information are the same number. If not all the four selected numbers are the same number (NO at S131), the process proceeds to S132. If less than four selected numbers are included in the received bet information, the process also proceeds to S132.

At S132, the main control CPU 80 performs first savings processing. In the processing, the main control CPU 80 saves, in a first progressive jackpot fund, 1.5% of the bet amount corresponding to the number of chips included in the received bet information. The first progressive jackpot fund is stored in the RAM 82. Then the process proceeds to S117 in FIG. 1.

Meanwhile, at S131 in FIG. 17, if all four the selected numbers are the same number (YES at S131), the process proceeds to S133.

At S133, the main control CPU 80 performs second savings processing. In the processing, the main control CPU 80 saves, in a second progressive jackpot fund, 1.5% of the bet amount corresponding to the number of chips included in the received bet information. The second progressive jackpot fund is stored in the RAM 82. Then the process proceeds to S117 in FIG. 1.

It should be noted that the savings processing is performed with respect to all the pieces of received bet information.

Next, the main control CPU 80 executes a game with the roulette wheel 3 in accordance with a game execution program. First, at S117, the ball discharging unit 85 throws the ball 16 onto the roulette wheel 3. The thrown ball 16 rolls on the roulette wheel 3 along the guide wall 18. When the rotation speed reduces and the centrifugal force is lost, the ball 16 rolls down the slope of the frame 11 and goes to the inside thereof and arrives at the rotating rotation disk 12 (see FIG. 2 described above).

The ball 16 rolling to the rotation disk 12 further passes through the surfaces of the number indication plates 14 outside the rotating rotation disk 12 and is housed in any one of the ball housing groove 13, and the number described on the number indication plate 14 corresponding to the ball housing groove 13 in which the ball 16 is housed (any one of “0”, “00”, “1” to “36”) becomes the winning number.

Subsequently, after the ball 16 is housed in the ball housing groove 13, the main control CPU 80 performs winning number processing at S118. In this processing, the main control CPU 80 drives the win determination unit 84 for identifying to which number the ball housing groove 13 in which the ball is housed corresponds. The identified number (winning number) is stored in a winning number storage area 82B of the RAM 82 by the main control CPU 80. Further, the main control CPU 80 transmits winning number information in which the identified number (winning number) is included to all the satellites 4. Then, the process proceeds to S119.

At S119, the main control CPU 80 performs number-of-games processing. In this processing, the main control CPU 80 increments “1” to the value stored in the executed number-of-games field 314 in each file 301. Then the process proceeds to S120.

At S120, the main control CPU 80 performs number-of-games match determination. Specifically, the main control CPU 80 performs the determination based on the values stored in the fields 313 and 314 by item number in each file 301. Then the process proceeds to S121.

At S121, the main control CPU 80 determines whether or not a number-of-games match is found. This determination is performed based on the determination of S120 above. That is, if the values in fields 313 and 314 sharing the same item number are matched, the main control CPU 80 determines that there is a number-of-games match. Further, the main CPU 80 identifies an item number of the matched fields, and then identifies the file 301 including the item number. This identification is performed to all the item numbers in which the fields 313 and 314 have the same value. Here, if there is no number-of-games match (NO at S121), the process proceeds to S126 described later. Meanwhile, if there is a number-of-games match (YES at S121), the process proceeds to S122.

At S122, the main control CPU 80 determines winning number match. This determination is performed with respect to all the item numbers identified at S121 as above described. Here, the main CPU 80 determines how many selected numbers stored in the prediction data field 312 corresponding to one of the item numbers identified at the above S121 match the winning numbers stored in the above S118.

The winning numbers to be used in the determination are as follows:

(1) The most recent four winning numbers, if "4" is stored as the designated number-of-games in the designated number-of-games field 313 corresponding the item number identified at the above S121;

(2) The most recent three winning numbers, if "3" is stored as the designated number-of-games in the designated number-of-games field 313 corresponding the item number identified at the above S121;

(3) The most recent two winning numbers, if "2" is stored as the designated number-of-games in the designated number-of-games field 313 corresponding the item number identified at the above S121; and (4) The most recent one winning number, if "1" is stored as the designated number-of-games in the designated number-of-games field 313 corresponding the item number identified at the above S121.

The above condition in the determination may include the number order.

After the determination is performed, the process proceeds to S123.

Figure 18:
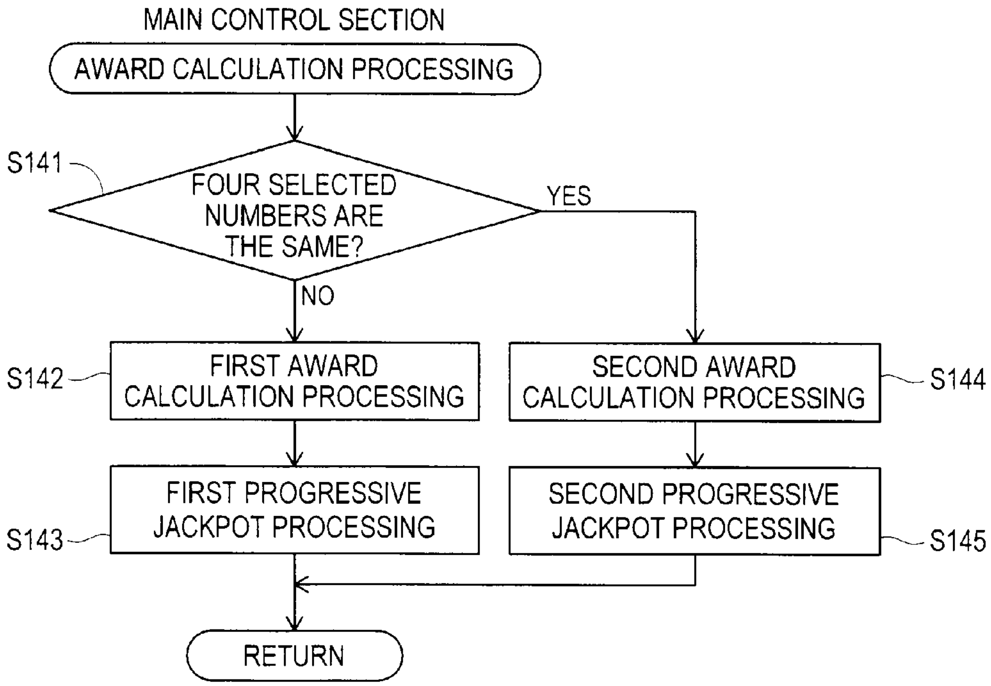
FIG. 18 is a flowchart of a lotto-type roulette game processing program according to the embodiment of the present invention.

At S123, the main control CPU 80 performs award calculation processing. FIG. 18 illustrates a flowchart of an award calculation processing program. The processing is performed with respect to each of the item numbers identified at the above S121.

The main control CPU 80 determines, at S141, whether all the maximum of four selected numbers stored in the prediction data field 312 corresponding to the item number identified at S121 as above described is the same number or not. If not all four selected numbers are the same number (NO at S141), the process proceeds to S142. If less than four selected numbers are stored in the prediction data field 312 corresponding to the item number identified at the above S121, the process also proceeds to S142.

At S142, the main control CPU 80 performs first award calculation processing. In the processing, the main control CPU 80 calculates the award amount based on the number of identical number pairs identified at the above S122, the number of chips stored in the bet number-of-chips field 315 corresponding to the item number identified at S121 as above described, the award table 61 of FIG. 7 and the like. Then the process proceeds to S143.

At S143, the main control CPU 80 performs first progressive jackpot processing. In this processing, the main control CPU 80 increments all the first jackpot fund to the calculated award amount if the number of identified number pairs identified at the above S122 is "4". Accordingly, the amount of the first jackpot fund immediately after the incrementing is "0". Part of the first jackpot fund may be incremented to the calculated award amount, alternatively. Following this processing, the process proceeds to S124 in FIG. 1.

At S141 in FIG. 18, meanwhile, if all four selected numbers are the same number (YES at S141), the process proceeds to S144.

At S144, the main control CPU 80 performs the second award calculation processing. In this processing, the main control CPU 80 calculates the award amount based on the number of identical number pairs identified at the above S122, the number of chips stored in the bet number-of-chips field 315 corresponding to the item number identified at S121 as above described, the award table 161 in FIG. 15 and the like. Then the process proceeds to S145.

At S145, the main control CPU 80 performs second progressive jackpot processing. In this processing, the main control CPU 80 increments the second jackpot fund to the calculated award amount if the number of identified number pairs identified at the above S122 is "4". Accordingly, the amount of the second jackpot fund immediately after the incrementing is "0". Part of the second jackpot fund may be incremented to the calculated award amount, alternatively. Following this processing, the process proceeds to S124 in FIG. 1.

At S124, the main control CPU 80 performs payout processing. In this processing, the main control CPU 80 creates payout information including the award amount calculated with respect to an item number identified at above-described S121. The payout information is transmitted to the satellite 4 corresponding to the file 301 of the item number currently identified by the main control CPU 80. The creation and transmission are performed with respect to all the item numbers identified at above-described S121. The process then proceeds to S125. Here, the main control CPU 80 makes a set of fields 312, 313, 314 and 315 corresponding to the item number identified at S121 free-space.

At S125, the ball collection unit 86 installed below the rotation disk 12 is driven for collecting the ball 16 on the rotation disk 12. The collected ball 16 will again be thrown onto the roulette wheel 3 in the later game. Following S125, the process proceeds to S101 in FIG. 16 described above.

Meanwhile, the satellite control CPU 91 determines, at S211 in FIG. 1, whether or not a bet period start signal transmitted from the main control section 83 is received or not. Here, if no bet period start signal is received (NO at S211), a wait mode is held until a bet start signal is received. If a bet period start signal is received (YES at S211), the process proceeds to S212.

At S212, the satellite control CPU 91 performs bet acceptance processing. FIG. 19 is a flowchart of a bet acceptance processing program. In this processing, the second BET screen 33 illustrated in FIG. 4 is displayed on the image display 7 of the satellite 4 used by the player, enabling the player to bet a chip. Other players can enter the game at midpoint and the roulette gaming machine 1 according to the present embodiment allows a maximum of ten players to play the game.

At S221 in FIG. 19, the satellite control CPU 91 determines whether or not the repeat button 201D is pressed. Here, the determination is performed based on operation information transmitted from the touch panel 28. If the repeat button 201D is pressed (YES at S221), the process proceeds to S225 described later. If the repeat button 201D is not pressed (NO at S221), the process proceeds to S222.

At S222, the satellite control CPU 91 determines whether or not any one of the number-of-times buttons 201A, 201B and 201C is pressed. Here, the determination is performed based on operation information transmitted from the touch panel 28. If any one of the number-of-times buttons 201A, 201B and 201C is pressed (YES at S222), the process proceeds to S224 described later. If none of the number-of-times buttons 201A, 201B and 201C is pressed (NO at S222), the process proceeds to S223.

At S223, the satellite control CPU 91 performs regular setting processing. In the processing, each player entering the game can operate the touch panel 28 during the bet period to select a maximum of four numbers (for example, "12", "21", "30" and "31") and bet his or her chip (see FIG. 4 described above). The specific bet method available in this processing is already described and therefore will not be discussed again. Following S223, the process proceeds to S213 in FIG. 1.

At S224 in FIG. 19, the satellite control CPU 91 performs same setting processing. Also in the processing, each player entering the game can operate the touch panel 28 during the bet period to select a maximum of four numbers and bet his or her chip.

Figure 20:
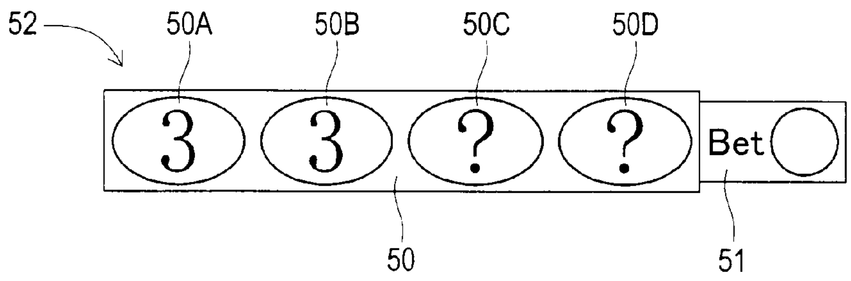
FIG. 20 is a schematic view illustrating a bet display section of the second BET screen according to the embodiment of the present invention.

However, if the number-of-times button 201A is pressed before a numeric button 63 is pressed, the same number as indicated on the numeric button 63 pressed after the number-of-times button 201A is pressed is selected twice in a row (for example, "3" and "3" as illustrated in FIG. 20).

Figure 21:
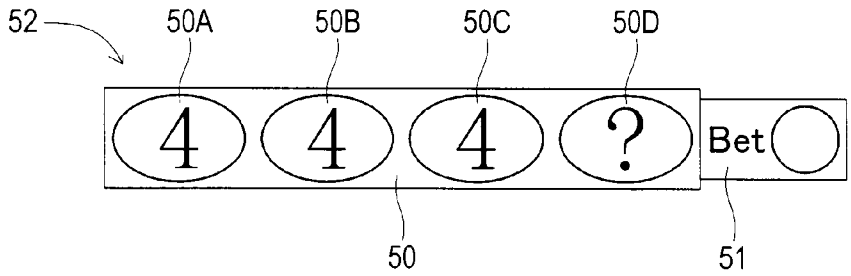
FIG. 21 is a schematic view illustrating a bet result display section of the second BET screen according to the embodiment of the present invention.

Also, if the number-of-times button 201B is pressed before a numeric button 63 is pressed, the same number as indicated on the numeric button 63 pressed after the number-of-times button 201B is pressed is selected three times in a row (for example, "4", "4" and "4" as illustrated in FIG. 21).

Figure 22:
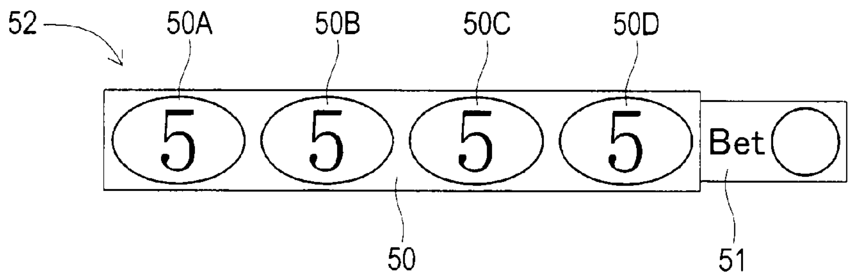
FIG. 22 is a schematic view illustrating a bet result display section of the second BET screen according to the embodiment of the present invention.

Also, if the number-of-times button 201C is pressed before a numeric button 63 is pressed, the same number as indicated on the numeric button 63 pressed after the number-of-times button 201C is pressed is selected four times in a row (for example, "5", "5", "5" and "5" as illustrated in FIG. 22).

Following S224, the process proceeds to S213 in FIG. 1.

At S225 in FIG. 19, the satellite control CPU 91 performs repetitive setting processing. Also in the processing, each player entering the game can operate the touch panel 28 during the bet period to select a maximum of four numbers and bet his or her chip.

However in this case, as illustrated in FIG. 22, the same set of numbers as a set of all numbers displayed in the selected number display section 50 is repeatedly selected.

Following S225, the process proceeds to S213 in FIG. 1.

At S213 in FIG. 1, the satellite control CPU 91 determines whether or not a bet end signal transmitted from the main control section 83 is received. If the bet end signal is not received (NO at S213), the process returns to the bet acceptance processing at S212. Accordingly, the current bet period continues. The current bet period is displayed with the BET timer graph 65. When the bet period start signal is received, the red graph starts to extend to the right gradually. When the red graph extends to the rightmost side, the bet period in the current game expires. Meanwhile, if the bet end signal is received (YES at S213), the process proceeds to S214.

At S214, the satellite control CPU 91 performs bet end processing. By the processing, the current bet period is terminated, and an image to the effect that the current bet period expires is displayed on the liquid crystal screen 29.

In the lotto-type roulette game, however, a chip may be bet on the next game immediately after a predetermined period of bet expires, contrary to the usual roulette game. In this case, game efficiency can be improved.

Following S214, the process proceeds to S215.

At S215, the satellite control CPU 91 performs bet information processing. In the processing, the satellite control CPU 91 transmits the current bet information (source address, a maximum of four selected numbers and number of chips bet on the maximum of four selected numbers) to the main control section 83. Then the process proceeds to S216.

At S216, the satellite control CPU 91 determines whether or not winning number information transmitted from the main control section 83 is received. Here, if no winning number information is received (NO at S216), a wait mode is entered until the winning number information is received. If the winning number information is received (YES at S216), the process proceeds to S217.

At S217, the satellite control CPU 91 performs winning number processing. In the processing, the satellite control CPU 91 transmits a control signal to the liquid crystal drive circuit 95. Accordingly, the new winning number is displayed additionally in the result history display section 45 and the result number display section 54. The new winning number is included in the winning number information thus received. Following S217, the process proceeds to S218.

At S218, the satellite control CPU 91 determines whether or not payout information transmitted from the main control section 83 is received. If no payout information is received (NO at S218), the process returns to S201 in FIG. 16. If payout information is received (YES at S218), the process proceeds to S219.

At S219, the satellite control CPU 91 performs payout processing. In the processing, the credit data corresponding to the award amount included in the payout information is added to RAM 93 by the satellite control CPU 91. Further, the satellite control CPU 91 transmits a control signal to the liquid crystal drive circuit 95. Accordingly, displays in the payback result display section 48, the credit points display section 49 and the win result display section 58 are updated. Then the process returns to S201 in FIG. 16.

The usual roulette game played in each of the steps S1 to S12 and the lotto-type roulette game played in each of the step S101 and steps that follow are carried out on one roulette gaming machine 1 at the same time. That is, the player can switch the display screen between the first BET screen 31 and the second BET screen 33 by pressing the screen switch button 34 or 46 displayed on the liquid crystal screen 29 and can play a lotto-type roulette game by displaying the second BET screen 33 while playing a usual roulette game using the first BET screen 31.

[Conclusion]

As described above, the roulette gaming machine 1 according to the present embodiment enables the player to switch the display screen between the first BET screen 31 provided with the table betting board 30 like a usual betting table and the second BET screen 33 provided with the new number selection betting board 32 by pressing the screen switch button 34, 46.

In the roulette game using the second BET screen 33, the player can predict the game results in a given number of games including the current game and select the given number of numbers at a time from among the numbers (38 numbers of "0", "00", and "1" to "36") displayed on the number indication plates 14 of the roulette wheel 3 using the number selection section 44. Then, after game processing is performed the given number of times with the roulette wheel 3, how many of the given number of selected numbers match the winning numbers is determined, and credit is paid out based on the match number count (the number of identical number pairs), so that the player can play the new lotto-type roulette game on one roulette gaming machine 1. Therefore, the variety of game plays of the roulette gaming machine 1 can be increased and the player can continue to have interest in the game.

Further, in the lotto-type roulette game using the second BET screen 33, credit award at a high ratio of 20000 times at the maximum may be given to the player, so that the desire of the player to play a game can be increased.

Further, the player can also play a usual roulette game of predicting only the current winning number on the first BET screen 31 using the table betting board 30 displayed by pressing the screen switch button 46, so that bet considering various demands of the player is made possible.

[Others]

The invention is not limited to the specific embodiment described above and various improvements and modifications can be made without departing from the spirit and the scope of the invention.

For example, in the present embodiment, as for the bet method on the second BET screen 33, the player predicts the game results in a maximum of four games including the current game and selects numbers for a maximum of four games at a time through the number selection section 44, but the maximum number of selected numbers is not limited to four and any number can be employed if it is at least two. In that case, as the number of selected numbers increases, the ratio of award to be paid out to the winning player can be made larger.

In the present embodiment, as for the lotto-type roulette game using the second BET screen 33, the award ratio of payout of credit responsive to the number of identical number pairs is fixed according to the award table 61 or 161 but may be changed at random from one game to another.

In the present embodiment, screen display is switched between the first BET screen 31 and the second BET screen 33 as the player presses the screen switch button 34, 46, but the liquid crystal screen 29 may be divided into two parts of right and left parts or upper and lower parts for displaying the first BET screen 31 and the second BET screen 33 at the same time. This enables the player to play two types of games at the same time without the need for operating the screen switch button 34, 46 for switching the screen.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed as new and desired to be secured by Letters Patent of the United States is:

1. A gaming machine comprising:

a plurality of betting terminals, each configured to receive a bet from a player on an outcome of a roulette game and a bet on an outcome of a Lotto-type roulette game in which a set of roulette games is played a predetermined number of times; and a gaming controller configured to execute the roulette game and the Lotto-type roulette game simultaneously over the plurality of betting terminals, wherein each of the plurality of betting terminals comprises:

a first input section configured to receive an input specifying Lotto-type roulette game bet information corresponding to a first prediction of a possible outcome for a first roulette game in the set of roulette games;

a second input section configured to receive an input specifying Lotto-type roulette game bet information corresponding to a second prediction of a possible outcome for a second roulette game in the set, the second prediction of the possible outcome for the second game being the same as the first prediction;

a third input section configured to receive an input specifying Lotto-type roulette game bet information corresponding to a bet amount for the Lotto-type roulette game; and a betting controller programmed to perform processing of:

(1) setting the Lotto-type roulette game bet information based on the first, second and third input sections; and (2) transmitting to the gaming controller the Lotto-type roulette game bet information containing the bet amount specified at the third input section and the Lotto-type roulette game bet information corresponding to the first and second input sections, and wherein, in order to control execution of the Lotto-type roulette game with respect to each of the plurality of betting terminals, the gaming controller is programmed to perform processing of:

(A) identifying, if the gaming controller receives the Lotto-type roulette game information from at least one of the plurality of betting terminals corresponding to the first, second and third input sections and including a prediction of possible outcomes for the predetermined number of the roulette games to be subsequently played in the set;

(B) determining, for the predetermined number of roulette games subsequently played and for which Lotto-type roulette game information was received by the gaming controller, whether any of the predicted possible outcomes in the set match with any of actual outcomes;

(C) calculating an award based on the Lotto-type roulette game information received, and whether any of the predicted possible outcomes in the set match with any of the actual outcomes; and (D) awarding the award to the at least one of the plurality of betting terminals having transmitted the Lotto-type roulette game information to the gaming controller and for which a number of predicted possible outcomes in the set match with any of the actual outcomes.

2. The gaming machine according to claim 1, wherein each of the plurality of betting terminals further comprises:

a fourth input section configured to receive an input specifying a number of times the first prediction is to be replicated for each of the number of predetermined games in the set, wherein the betting controller sets, upon execution of processing (1), Lotto-type roulette game bet information based on the first, second, third and fourth input sections.

3. The gaming machine according to claim 1, wherein the gaming controller is further programmed to perform processing of:

(E) saving, in a progressive jackpot fund, part of a bet amount contained in the Lotto-type roulette game information received; and (F) awarding, a portion of the progressive jackpot fund saved to at least one of the plurality of betting terminals having transmitted the Lotto-type roulette game information and having matched a predetermined number of predicted possible outcomes with a number of actual outcomes.

4. A control method for a gaming machine, the gaming machine including:

a plurality of betting terminals, each configured to receive a bet from a player on an outcome of a roulette game and a bet on an outcome of a Lotto-type roulette game in which a set of roulette games is played a predetermined number of times; and a gaming controller configured to execute the roulette game and the Lotto-type roulette game simultaneously over the plurality of betting terminals, wherein each of the plurality of betting terminals comprises:

a first input section configured to receive an input specifying Lotto-type roulette game bet information corresponding to a first prediction of a possible outcome for a first roulette game in the set of roulette games;

a second input section configured to receive an input specifying Lotto-type roulette game bet information corresponding to a second prediction of a possible outcome for a second roulette game in the set, the second prediction of the possible outcome for the second game being the same as the first prediction;

a third input section configured to receive an input specifying Lotto-type roulette game bet information corresponding to a bet amount for the Lotto-type roulette game; and a betting controller, wherein the method comprises, with the betting controller:

(1) setting the Lotto-type roulette game bet information based on the first, second and third input sections; and (2) transmitting to the gaming controller the Lotto-type roulette game bet information containing the bet amount specified at the third input section and the Lotto-type roulette game bet information corresponding to the first and second input sections, and wherein, in order to control execution of the Lotto-type roulette game with respect to each of the plurality of betting terminals, the gaming controller is programmed to perform processing of:

(A) identifying, if the gaming controller receives the Lotto-type roulette game information from at least one of the plurality of betting terminals corresponding to the first, second and third input sections and including a prediction of possible outcomes for the predetermined number of the roulette games to be subsequently played in the set;

(B) determining, for the predetermined number of roulette games subsequently played and for which Lotto-type roulette game information was received by the gaming controller, whether any of the predicted possible outcomes in the set match with any of actual outcomes;

(C) calculating an award based on the Lotto-type roulette game information received, and whether any of the predicted possible outcomes in the set match with any of the actual outcomes; and (D) awarding the award to the at least one of the plurality of betting terminals having transmitted the Lotto-type roulette game information to the gaming controller and for which a number of predicted possible outcomes in the set match with any of the actual outcomes.

5. The control method of claim 4, wherein each of the plurality of betting terminals further comprises:

a fourth input section configured to receive an input specifying a number of times the first prediction is to be replicated for each of the number of predetermined games in the set, and wherein the betting controller sets, upon execution of processing (1), Lotto-type roulette game bet information based on the first, second, third and fourth input sections.

6. The control method of claim 4, wherein the gaming controller is further programmed to perform processing of:

(E) saving, in a progressive jackpot fund, part of a bet amount contained in the Lotto-type roulette game information received; and (F) awarding, a portion of the progressive jackpot fund saved, to at least one of the plurality of betting terminals having transmitted the Lotto-type roulette game information and having matched a predetermined number of predicted possible outcomes with a number of actual outcomes.

* * * * *